United States Patent
Han et al.

(10) Patent No.: US 10,936,287 B2
(45) Date of Patent: Mar. 2, 2021

(54) RANDOM NUMBER GENERATION SYSTEM USING IMAGE SENSOR, RANDOM NUMBER GENERATION METHOD, DATABASE CONSTRUCTION METHOD, AND COMPUTER READABLE RECORDING MEDIUM IN WHICH SAID METHOD IS RECORDED AS COMPUTER PROGRAM

(71) Applicant: KOREA INSTITUTE OF SCIENCE AND TECHNOLOGY, Seoul (KR)

(72) Inventors: Sang Wook Han, Seoul (KR); Sung Wook Moon, Seoul (KR); Yong Su Kim, Seoul (KR); Byung Kwon Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 246 days.

(21) Appl. No.: 16/335,039

(22) PCT Filed: Sep. 26, 2017

(86) PCT No.: PCT/KR2017/010629
§ 371 (c)(1),
(2) Date: Mar. 20, 2019

(87) PCT Pub. No.: WO2018/062812
PCT Pub. Date: Apr. 5, 2018

(65) Prior Publication Data
US 2019/0278567 A1    Sep. 12, 2019

(30) Foreign Application Priority Data

Sep. 27, 2016 (KR) .......................... 10-2016-0124261
Sep. 18, 2017 (KR) .......................... 10-2017-0119558

(51) Int. Cl.
*G06F 7/58* (2006.01)
*G06F 16/51* (2019.01)
(Continued)

(52) U.S. Cl.
CPC .............. *G06F 7/588* (2013.01); *G06F 16/51* (2019.01); *H04N 5/357* (2013.01); *H04N 5/372* (2013.01); *H04N 5/374* (2013.01)

(58) Field of Classification Search
CPC ......... G06F 7/588; G06F 16/51; H04N 5/357; H04N 5/372; H04N 5/374
(Continued)

(56) References Cited

U.S. PATENT DOCUMENTS 10,698,659 B2 *  6/2020  Choi .................... H04L 9/0852
2009/0262928 A1  10/2009  Busari
(Continued)

FOREIGN PATENT DOCUMENTS

JP       2010-271888 A    12/2010
KR   10-2008-0108230 A    12/2008
(Continued)

OTHER PUBLICATIONS

Bruno Sanguinetti et al., "Quantum random number generation on a mobile phone", Physical Review, May 2, 2014, pp. 1-5.

*Primary Examiner* — Tan V Mai
(74) *Attorney, Agent, or Firm* — Rabin & Berdo, P.C.

(57) ABSTRACT

The present invention provides a random number generation system comprising: an image sensor module for outputting dark noise generated from each unit pixel region respectively that is shielded from external light as digital data; and a control unit for classifying the respective pieces of digital data output from the image sensor module, for allocating random numbers to the same using a database in which a plurality of reference values are stored for each unit pixel,
(Continued)

and for collating the same so as to generate a first random number.

21 Claims, 28 Drawing Sheets

(51) Int. Cl.
  *H04N 5/357* (2011.01)
  *H04N 5/372* (2011.01)
  *H04N 5/374* (2011.01)
(58) Field of Classification Search
  USPC .................................................. 708/250–256
  See application file for complete search history.

(56) References Cited

U.S. PATENT DOCUMENTS

| | | |
|---|---|---|
| 2013/0010952 A1 | 1/2013 | Muise et al. |
| 2014/0312918 A1 | 10/2014 | Massetti et al. |
| 2016/0150173 A1 | 5/2016 | Johansson |
| 2018/0270434 A1* | 9/2018 | Chow .................. G06K 9/6206 |
| 2020/0404765 A1* | 12/2020 | Rodinger .............. F21V 21/005 |

FOREIGN PATENT DOCUMENTS

| | | |
|---|---|---|
| KR | 10-2014-0049523 A | 4/2014 |
| KR | 10-2015-0124405 A | 11/2015 |
| KR | 10-1593300 B1 | 2/2016 |

* cited by examiner

RANDOM NUMBER GENERATION SYSTEM USING IMAGE SENSOR, RANDOM NUMBER GENERATION METHOD, DATABASE CONSTRUCTION METHOD, AND COMPUTER READABLE RECORDING MEDIUM IN WHICH SAID METHOD IS RECORDED AS COMPUTER PROGRAM

TECHNICAL FIELD

The present invention relates to a random number generation technique, and more particularly, to a random number generation system configured to generate a random number using electric current generated from an image sensor while external light is shielded, a random number generation method, a database construction method, and a computer readable recording medium in which the method is recorded as a computer program.

BACKGROUND ART

A random number generator is widely used in many traditional fields such as simulation, gaming, cryptography, etc., and various kinds of random number generators have been developed to meet various performance. For example, a pseudorandom number generator (Pseudo-RNG) has attracted attention in the field of simulation and gaming due to its excellent characteristics such as a high bit rate, a non-biased output, cost efficiency, and ease of implementation. On the other hand, a physical random number generator (PRNG), which uses a disordered status of a physical process such as thermal noise, chaotic lasers, circuit noise, optical noise, and air disturbance, is applied to the field of cryptography, which requires a high level of randomness.

Many researchers in this field have focused on a quantum random number generator (QRNG), which uses essentially unpredictable quantum phenomena. A single photon arrival time, photon-number resolving, spontaneous emission of a laser, and vacuum fluctuation are utilized as a quantum source of the QRNG.

Recently, since complementary metal-oxide-semiconductor (CMOS) image sensor technology has been remarkably improved and thus can provide image data with little electron readout noise, Korean Patent Publication No. 10-2015-0124405 discloses a QRNG using a CMOS image sensor wherein the level of photon shot noise is measured and utilized as a random number source.

Such a QRNG has many advantages such as cost efficiency, low power use, scalability, and a high bit rate but requires an additional light source, fairly complex feedback hardware for stabilizing light, and an optical device for uniformly emitting light at all pixels. As a result, there are limitations in applying the QRNG to mobile applications.

RELATED ART DOCUMENTS

Patent Document (Patent Document 1) Korean Patent Publication No. 10-2015-0124405

Non-Patent Document (Non-Patent Document 1) Quantum Random Number Generation on a Mobile Phone, PHYSICAL REVIEW X 4, 031056 (2014)

DETAILED DESCRIPTION OF THE INVENTION

Technical Problem

The present invention provides a method of generating a quantum random number with excellent randomness in a convenient and relatively simple manner.

The present invention also provides a random number generation system for generating a random number without any hardware change in a mobile device equipped with an image sensor.

Technical Solution

In order to solve the above-described problems, according to a first aspect of the present invention, there is provided a random number generation method including (a) outputting, as digital data, electric currents generated from unit pixel regions of an image sensor shielded from external light on a unit pixel; (b) classifying the digital data for each unit pixel using a database in which a plurality of reference values are stored for each unit pixel and then allocating random numbers; and (c) collecting the random numbers allocated for each unit pixel to generate a first random number.

Preferably, the random number generation method further includes performing a post-process for removing technical noise on the first random number to generate a second random number.

The reference values stored for each unit pixel may be different from or the same as those for other unit pixels. Preferably, a number of reference values stored for each unit pixel is three, seven, or fifteen. The digital data values may be classified into four regions when the number of reference values is three, eight regions when the number of reference values is seven, and sixteen regions when the number of reference values is fifteen.

Preferably, construction of the database includes measuring an electric current distribution for each unit pixel; determining a bit to be allocated according to the electric current distribution for each unit pixel; and deriving reference values for classifying the digital data according to the bit to be allocated.

The electric current distribution for each unit pixel may be a Poisson distribution.

Preferably, the determining of a bit to be allocated according to the electric current distribution is performed using a min-entropy method, and the minimum entropy may be expressed using Equation 1 below:

$$H_{min}(X) = -\log_2\left[\max_{x \in X} P_X(x)\right]. \qquad \text{[Equation 1]}$$

Here, X is a variable of distribution $P_x(x)$, X represents a random sequence, x represents a sample point, and max $P_x(x)$ represents the maximum value among probabilities of occurrence of a point x of a random source.

Preferably, the shielding of external light in the image sensor is performed by covering the image sensor with a cap or by making some of the image sensor with light-shielded unit pixels.

According to a second aspect of the present invention, there is provided a method of constructing a database to generate a random number, the method including measuring an electric current distribution for each unit pixel of an image sensor shielded from external light; determining a bit to be allocated according to the electric current distribution for each unit pixel; and deriving reference values for classifying digital data according to the bit to be allocated.

Preferably, the determining of a bit to be allocated according to the electric current distribution is performed using a min-entropy method.

Preferably, the reference values stored for each unit pixel are different from those for other unit pixels.

According to a third aspect of the present invention, there is provided a random number generation system including an image sensor module configured to output, as digital data, electric currents generated from unit pixel regions of an image sensor shielded from external light; a database wherein a plurality of reference values are stored for each unit pixel; and a control unit configured to classify the digital data for each unit pixel using the database, allocate random numbers, and collect the random numbers allocated for each unit pixel to generate a first random number.

The image sensor has an effective pixel region including a plurality of effective pixels in order to convert external light into an electric signal; and a light shield pixel region, which includes a plurality of light-shielded pixels, that outputs electric currents generated while external light is shielded.

Preferably, the image sensor module includes an image sensor and an analog-digital converter configured to digitally change an electric current signal output from the image sensor.

Preferably, a light shield layer for shielding external light is provided in the pixels of the light shield pixel region.

Preferably, an average dark current of the pixels of the light shield pixel region is greater than that of the pixels of the effective pixel region.

Preferably, an electric current output from the light shield pixel region is used to correct a reset signal of effective pixel data of the effective pixel region.

Preferably, a control unit further performs a post-process for removing technical noise on the first random number to generate a second random number.

Preferably, the image sensor is a complementary metal-oxide-semiconductor (CMOS), a charge-coupled device (CCD), an infrared LED array, or a bolometer.

According to a fourth aspect of the present invention, there is a computer-readable recording medium having a computer program recorded thereon for the random number generation method and the database construction method.

Advantageous Effects of the Invention

According to the present invention, since an electric current (dark noise) generated from an external-light-shielded pixel region of an image sensor is used, no additional light source is necessary to generate random numbers.

Also, the present invention may be simply implemented and may be applied to small and inexpensive mobile applications because no additional hardware is required.

BEST MODE

Figure 1:
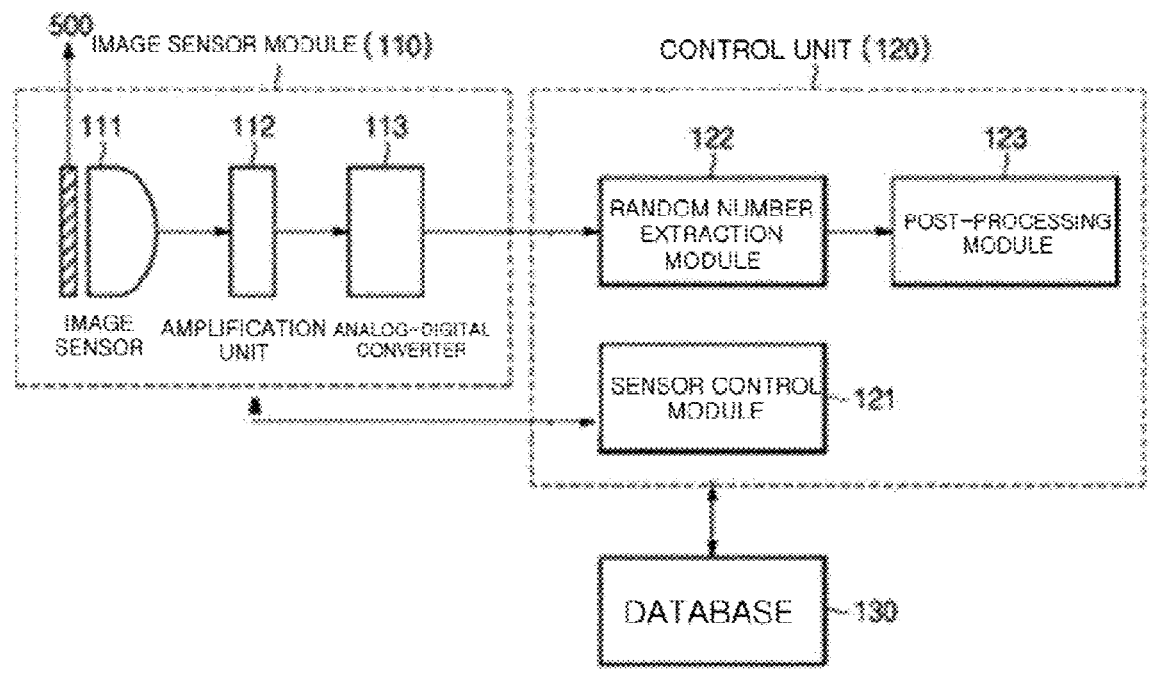
FIG. 1 is a block diagram of a random number generation system according to an embodiment of the present invention.

Advantages and features of the present invention, and implementation methods thereof will be clarified through following embodiments described with reference to the accompanying drawings. The invention may, however, be embodied in different forms and should not be construed as limited to the embodiments set forth herein. Rather, these embodiments are provided so that this disclosure will be thorough and complete, and will fully convey the scope of the present invention to those skilled in the art. Therefore, the scope of the invention is defined only by the appended claims. Like reference numerals refer to like elements throughout. As used herein, the term "and/or" includes any and all combinations of one or more of the associated listed items.

In the present invention, "an electric current generated from an external-light-shielded unit pixel region" refers to a flow of electrons generated from the external-light-shielded unit pixel region when an image sensor generates image data and thus may be referred to as dark noise. That is, since the electric current is noise generated in a dark state, the electric current may be referred to as dark noise, and the dark noise may include technical noise and dark shot noise. Here, the technical noise corresponds to noise generated in a circuit that measures the amount of light emitted to a pixel and performs analog-digital conversion, and dark shot noise corresponds to noise generated due to a change in electric current in a pixel, excluding light when the light is sensed by the image sensor, that is, due to the instability of the number of electron-hole pairs. In the present invention, the dark shot noise plays an important role in generating a quantum random number.

This will be described in detail. An image sensor module performs signal processing on light incident through a color filter, a pixel, an amplifier, and an analog-digital converter, and finally converts light energy into electric energy to generate an image. For example, an image sensor converts 1280 sequentially converts a 1280×720 pixel array into digital image data using an 8-bit or 10-bit analog-digital converter.

In this case, the image sensor is composed of pixels using a photodiode with a p-n junction structure, the photodiode is designed to operate in reverse bias, and a depletion region is formed at the middle of the p-n junction of the photodiode. In the depletion region, electron-hole pairs that are naturally generated due to heat or other noise create a small dark current. Here, the electron-hole pairs move by a high reverse bias, and the number of slit electron-hole pairs follows the Poisson distribution.

As a result, noise of the distribution of the number of electron-hole pairs forming the dark current of the image sensor (fluctuation noise) corresponds to dark shot noise. In the present invention, the dark shot noise is utilized as a main source for generating a random number.

As described above, technical noise as well as dark shot noise is included in noise generated from external-light-shielded pixel regions when an image sensor generates image data. In the present invention, the technical noise may be additionally used to generate a random number.

FIG. 1 is a block diagram of a random number generation system according to a preferred embodiment of the present invention.

Referring to FIG. 1, a random number generation system 100 is configured to include an image sensor module 110, a control unit 120, and a database 130, and the control unit includes a random number extraction module 122, a sensor control module 121, and a post-processing module 123.

The image sensor module 110, which is a device for converting an external optical image signal into an electric image signal, generates image data with noise. The generated image data is converted into a digital signal and then output by means of an amplifier 112 and an analog-digital converter 113. For example, the image sensor module 111 may correspond to a complementary metal-oxide-semiconductor (CMOS), a charge-coupled device (CCD), an infrared LED array, or a bolometer. Here, the CMOS image sensor uses a scheme in which each pixel changes a light signal radiated from a corresponding part of a subject into electrons using a photodiode, stores the electrons, changes an electric charge quantity proportional to the number of electrons stored into a voltage signal, and outputs the voltage signal. The CMOS image sensor may be used in various electronic products, such as a mobile device, a PC camera, a video camera, or a digital camera.

Preferably, the image sensor module 110 generates image data, which is dark noise generated from an external-light-shielded pixel region, converts the image data into digital data, and transmits the digital data to the control unit 120.

The image sensor 111 may have an external-light-shielded pixel region implemented in various forms. The image sensor 111 having an external-light-shielded pixel region may mean that light is blocked from entering the entirety of the image sensor and also may mean that light is allowed to enter a portion of the image sensor (or an effective pixel) and is blocked from entering the remaining portion of the image sensor.

Figure 2:
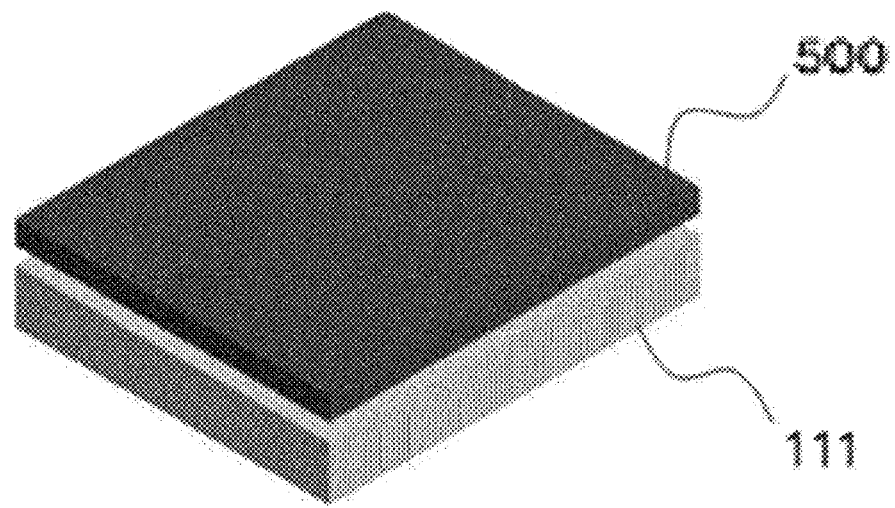
FIG. 2 is a diagram showing an image sensor according to an embodiment of the present invention.

FIG. 2 is a diagram showing an image sensor according to an embodiment. As an example shown in FIG. 2, a light shielding means 500 is added to the exterior of the image sensor so that light does not enter the image sensor.

In practical examples, first, the image sensor may be implemented to block light from entering each effective pixel that light may enter. For example, a separate cap, layer, or the like for blocking light entrance in any way may be added to upper portions of the effective pixels. For an electronic apparatus such as a camera, light may be prevented from entering the image sensor by a cap covering the imager sensor when the electronic apparatus is already produced. When the electronic apparatus is being produced, light may be blocked from entering some or all of the effective pixels of the image sensor. It will be appreciated that in an actual implement, the image sensor may be placed in a separate enclosed space for preventing external light from entering the upper portions of the pixels of the electronic apparatus.

Alternatively, light-shielded pixels, other than effective pixels designed to receive light when the image sensor is produced, may be utilized. Typically, CMOS image sensors commercially available from manufacturers have pixels designed to block external light, which are called optical black pixels (OBPs). By using these pixels, it is possible to utilize an external-light-shielded pixel region in the image sensor 110. It will be appreciated that the image sensor is intentionally designed to block external light in a process of producing the image sensor.

Figure 3:
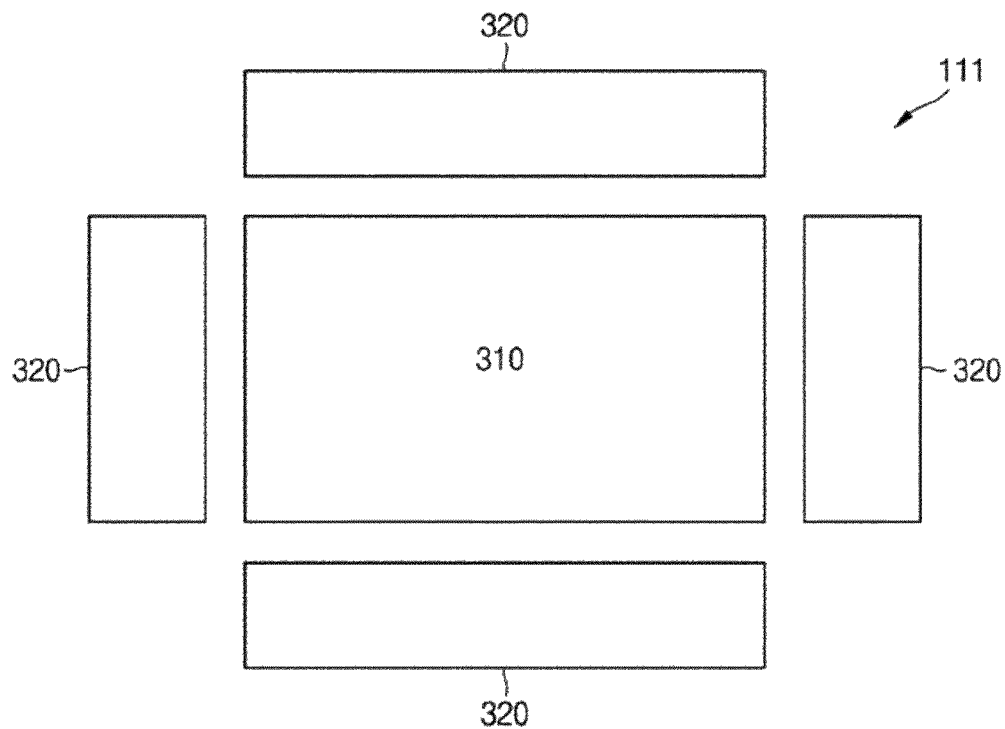
FIG. 3 is a diagram for describing another configuration of an image sensor according to an embodiment of the present invention.
Figure 4:
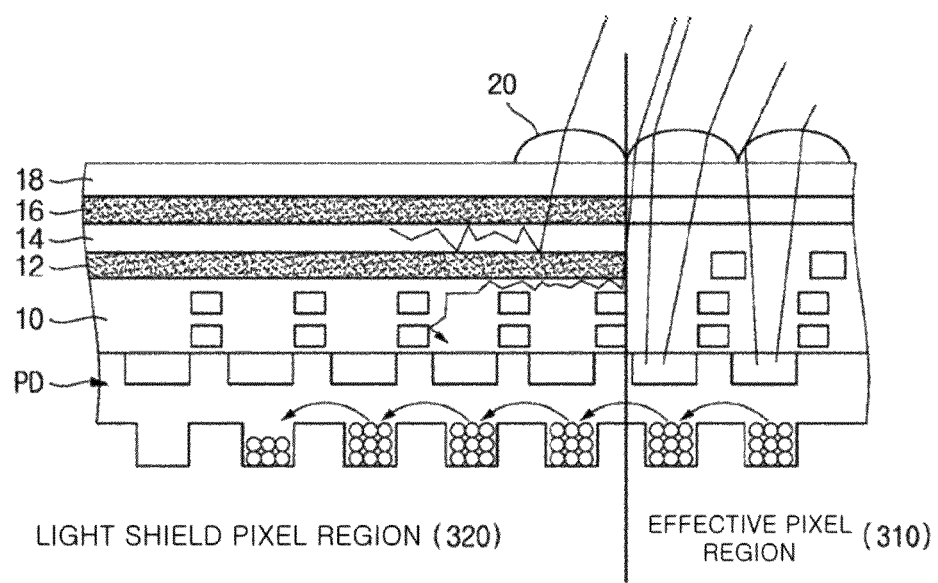
FIG. 4 is a cross-sectional view of a pixel array of the image sensor.

FIG. 3 is a diagram for describing another configuration of an image sensor according to an embodiment, and FIG. 4 is a cross-sectional view of a pixel array of the image sensor.

Referring to FIG. 3, the image sensor 111 may include an effective pixel array 310 including a plurality of effective pixels and an optical black pixel (OBP; 320) placed on the outer periphery of the effective pixel array. Here, the optical black pixel maintains a black level using a light-shielded pixel. That is, the image sensor 111 may transmit, to a control unit, image data including noise generated from the optical pixel array. In detail, referring to FIG. 4, which is a cross-sectional view of the pixel array of the image sensor 110, a photodiode PD of the optical black pixel 320 stores photo-charges corresponding to an optical phase of a subject formed in an epilayer, and an interlayer insulating film 10 is formed on a semiconductor substrate on which a transfer transistor is formed over the photodiode PD. Also, a light shield metal layer 12 for blocking incident light is formed over the interlayer insulating film 10, and a protective film 14, a color filter 16 for implementing a color image, and a flat layer 18 for planarization are formed over the light shield metal layer 12. Also, a micro-lens 20 is formed over the flat layer 18.

Next, the image sensor according to an embodiment of the present invention will be described. The image sensor 111 is configured to include an effective pixel region 310 and a light shield pixel region 320 and is mainly characterized in that the image sensor 111 increases a dark current of a light detector of the light shield pixel region 320 over a dark current of a light detector of the effective pixel region 310. Generally, a hot pixel refers to a pixel with a high dark current, and a cold pixel refers to a pixel with a low dark current. The dark currents are also sensitive to temperature. To increase a random number generation rate, a pixel with a high dark current deviation is preferable. Considering these points, according to an embodiment of the present invention, an image sensor is implemented in which the dark current of the light detector of the light shield pixel region 320 is increased over the dark current of the light detector of the effective pixel region 310.

The implementation in which the dark current of the light detector of the light shield pixel region 320 is increased over the dark current of the light detector of the effective pixel region 310 will be described below.

Figure 5:
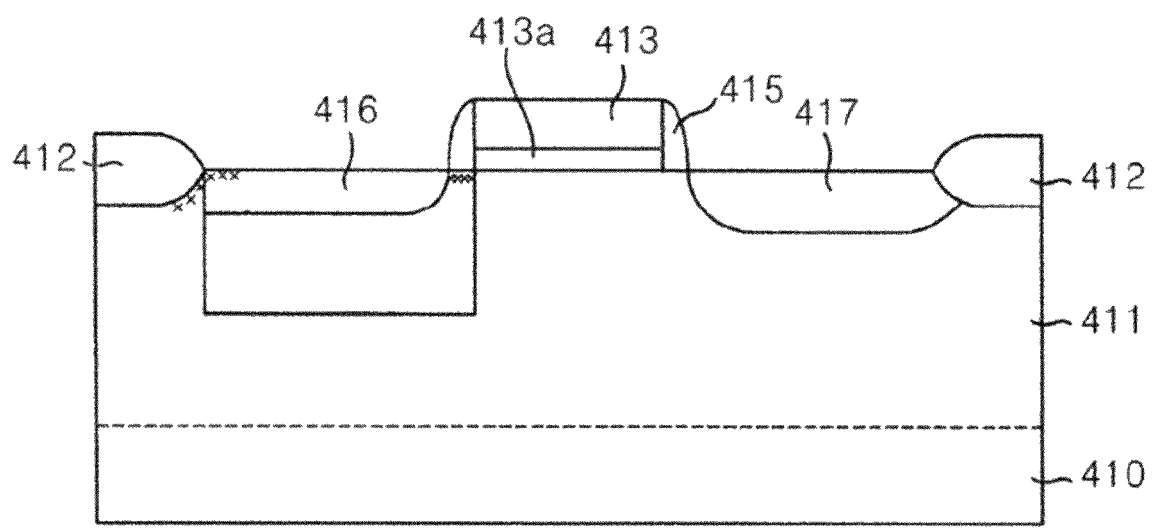
FIG. 5 is a cross-sectional view of a unit pixel of an image sensor according to an embodiment of the present invention.

FIG. 5 is a cross-sectional view of a unit pixel of an image sensor according to an embodiment of the present invention.

Referring to FIG. 5, a p-type substrate 410 has an epitaxially grown p-type epilayer 411 and a field oxide film 412, and a transfer transistor gate electrode 413 is formed on the surface of the p-type epilayer 411. Also, a photodiode-specific n-type ion implantation region 414 is formed inside the p-type epilayer 411, and a photodiode-specific p-type ion implantation region 416 is formed over the photodiode-specific n-type ion implantation region 414 and under the surface of the p-type epilayer 411. The transfer transistor gate electrode 413 has a spacer 415 on a side wall thereof, and a floating diffusion region 417 is formed on one side of the gate electrode 413. In this structure, when a reverse bias is applied between the n-type ion implantation region 414 and a p-type region (the p-type epilayer 411 and the p-type ion implantation region 416) and the photodiode-specific n-type ion implantation region 414 and the p-type ion implantation region 16 have appropriate ion implantation concentrations, the n-type ion implantation region 414 is completely depleted, and the depletion region extends to the p-type epilayer 411 and the p-type ion implantation region 416. In this case, the depletion region may further extend to the p-type epilayer 411, which has a relatively low dopant concentration. The depletion region accumulates and stores photo charges generated by incident light, and the photo charges are used for image reproduction.

In an image sensor unit pixel, dark noise in the present invention refers to an electric current flowing while external light is blocked, that is, dark current. Correspondingly, according to an implementation of the present invention, the dark current of the light detector may be increased over the dark current of the light detector of the effective pixel region 310. Typically, a dark current is generated by electrons moving to a floating diffusion region in a photodiode. It is known that the dark current of the light shield pixel region 320 mainly originates from various defects or dangling bonds distributed at the base of a silicon surface and at the edge of a field oxide film.

That is, as shown in FIG. 5, the portions denoted by x represent the base of a silicon surface and the boundary between an active region and a field oxide film, from which dark currents are induced. Accordingly, in order to differently implement dark currents in the effective pixel region 310 and the light shield pixel region 320, the various defects and dangling bonds between the effective pixel region 310 and the light shield pixel region 320 may be changed in amount, or a dose quantity and ion implantation energy may be changed in an ion implantation process while the n-type ion implantation region 414, the p-type ion implantation region 416, and the like are formed.

A structure in which the dark current of the light detector of the light shield pixel region 320 is increased over the dark current of the light detector of the effective pixel region 310 using the above-described principle will be illustrated below.

Figure 6:
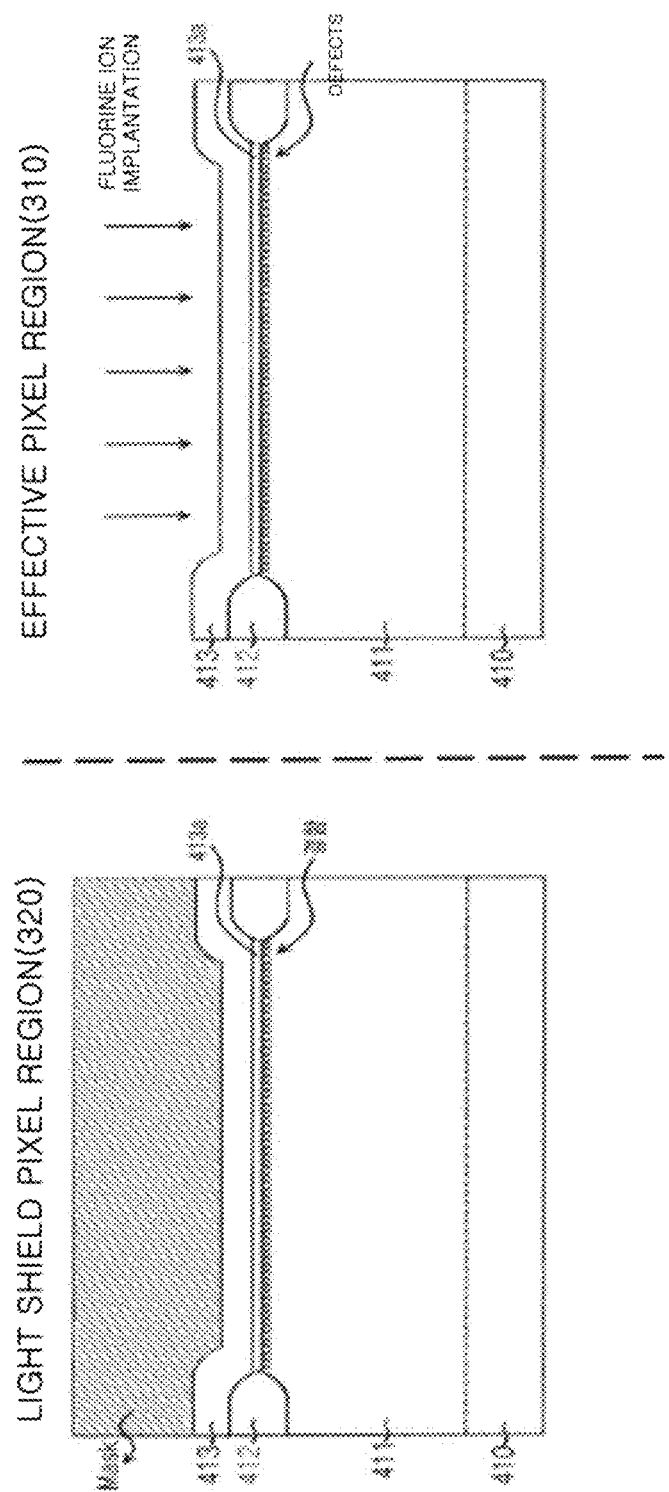
FIGS. 6 and 7 are cross-sectional views of an image sensor in a manufacturing process according to an embodiment of the present invention.
Figure 7:
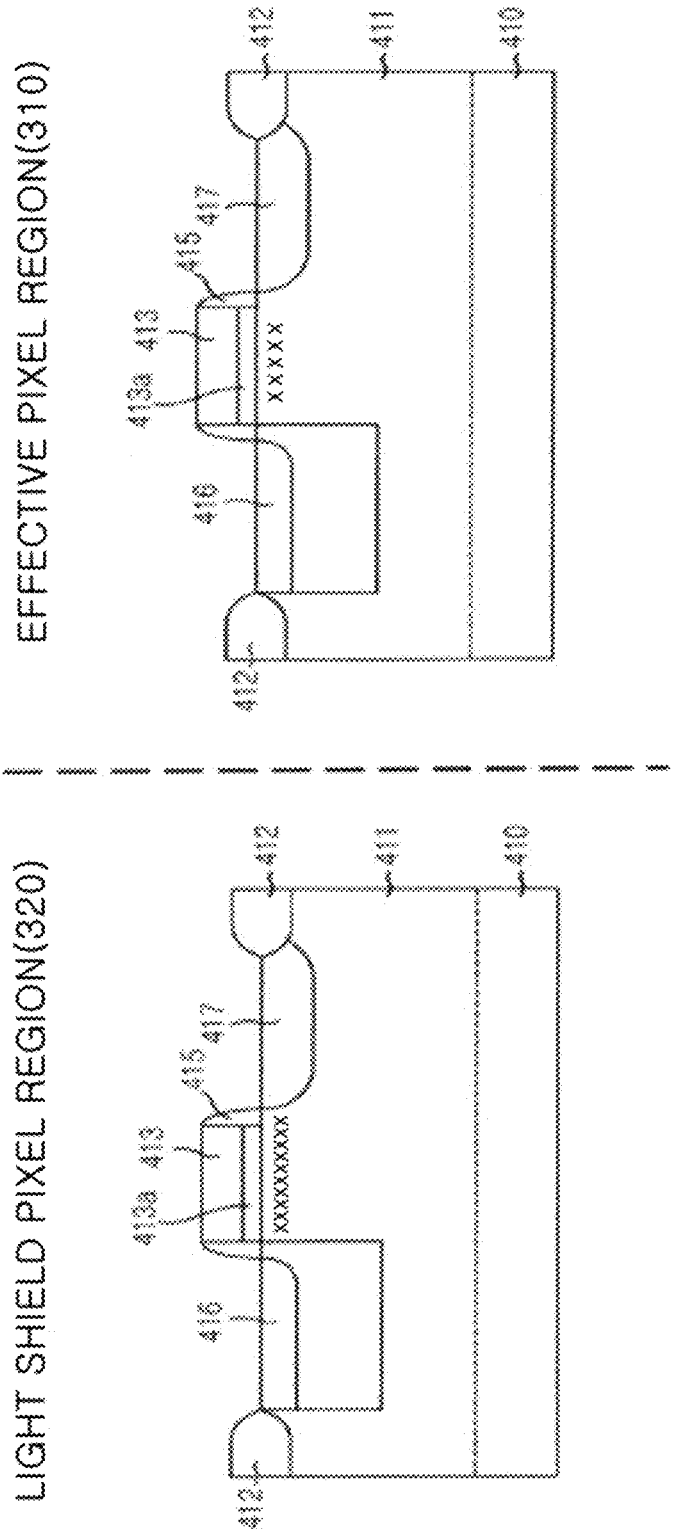

FIGS. 6 and 7 are cross-sectional views of an image sensor in a manufacturing process according to an embodiment of the present invention.

Referring to FIG. 6, an epitaxially grown p-type epilayer 411 and a field oxide film 412 are formed on a p-type substrate 410, and a gate insulating film 413*a* and a gate electrode 413 are formed on the surface of the p-type epilayer 411 in order to form a transistor. In this situation, a unit pixel of the light shield pixel region 320 and a unit pixel of the effective pixel region 310 are equal to each other. Under such circumstances, fluorine ion implantation is performed on a front surface on which the gate electrode is formed. In this case, the ion implantation may not be achieved in the light shield pixel region 320 using a mask such as photoresist, and fluorine ions may be implanted into the effective pixel region 310. The fluorine ion implantation reduces the defects and dangling bonds between the gate oxide film and the silicon substrate, and the reduction causes a decrease in dark current due to the reason described above. As shown in FIG. 7, it can be seen that the number of "x" marks representing the defects between the gate oxide film and the silicon substrate of the effective pixel region 310 is decreased to be fewer than the number of "x" marks of the light shield pixel region 320.

Next, referring to FIG. 7, the same unit pixel producing process is applied to the effective pixel region 310 and the light shield pixel region 320. For example, a photodiode-specific n-type ion implantation region 414 is formed inside the p-type epilayer 411, and a photodiode-specific p-type ion implantation region 416 is formed over the photodiode-specific n-type ion implantation region 414 and under the surface of the p-type epilayer 411. The transfer transistor gate electrode 413 has a spacer 415 on a side wall thereof, and a floating diffusion region 417 is formed on one side of the gate electrode 413.

There are various methods for increasing the dark current of the light detector of the light shield pixel region 320 to be greater than the dark current of the light detector of the effective pixel region 310, and some of the methods will be described as an example. When a hydrogen ion implantation process is performed on a p/p+ epilayer to reduce metal contamination in a photodiode region of an image sensor, the process is performed only on an effective pixel region and not on a light shield pixel region because dark currents are reduced. Also, when an isolation addition process for isolating a photodiode and an adjacent trench edge portion is performed in order to prevent occurrence of dark currents and defects in the photodiode and the trench edge, the process is performed only on an effective pixel region and not on a light shield pixel region because dark currents are reduced. Also, when a dark current reduction process is performed by forming a p-type ion implantation region constituting a photodiode to surround dark currents, the process is performed only on an effective pixel region and not on a light shield pixel region because dark currents are reduced.

Figure 8:
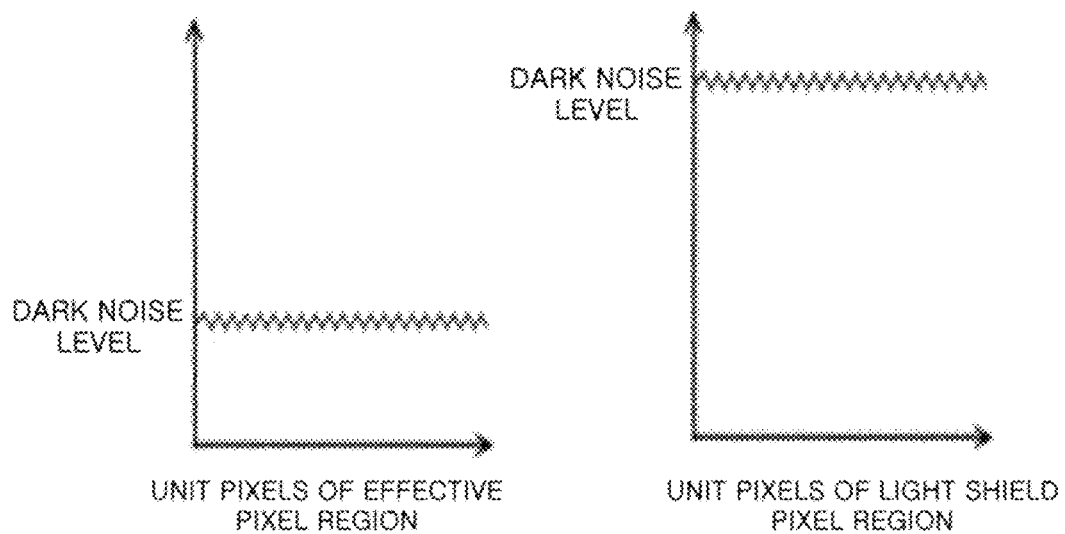
FIG. 8 is a diagram showing that a dark current of a light detector in a light-shielded pixel region is greater than a dark current of a light detector in an effective pixel region.

FIG. 8 is a conceptual view showing that the dark current of the light detector of the light shield pixel region 320 is increased over the dark current of the light detector of the effective pixel region 310 as a result of the process of FIG. 7. FIG. 8 shows a result of measuring and comparing a dark noise level of unit pixels of the light shield pixel region 320 and a dark noise level of unit pixels of the effective pixel region. Referring to FIG. 8, it can be seen that the unit pixels of the light shield pixel region 320 has a higher dark noise level than those of the effective pixel region 310. Meanwhile, it may be necessary to adjust the difference between the levels as needed. Generally, when the dark noise of the unit pixels of the effective pixels is measured, each pixel has a certain deviation and thus, for example, a variation of 10% to 30%. Also, in an implementation, the dark noise of the unit pixels of the light shield pixel region may have a somewhat greater average magnitude than the dark noise level of the unit pixels of the effective pixel region. For example, the difference in magnitude may be up to 50%.

However, as described above, a process of intentionally increasing the dark current magnitude of the unit pixels of the light shield pixel region 320 may be performed. Preferably, the dark noise level of the unit pixels of the light shield pixel region 320 may be further increased by 50% to 1000%. This implementation has an advantage in that a random number generation rate can be dramatically increased.

Figure 9:
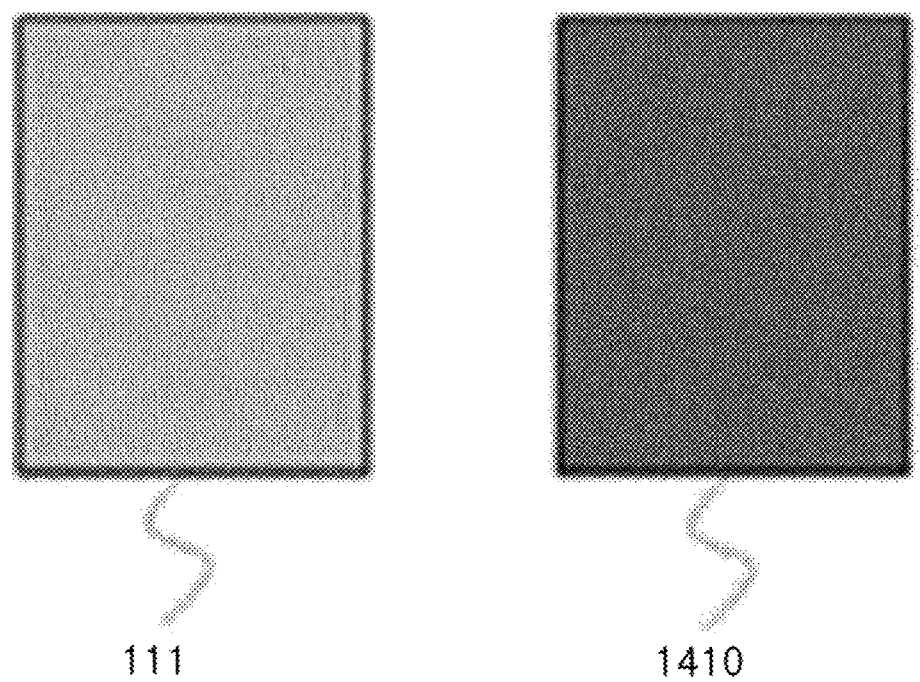
FIG. 9 is a diagram showing an image sensor according to another embodiment of the present invention.

FIG. 9 is a diagram showing an image sensor according to another embodiment.

Referring to FIG. 9, another image sensor 1410 placed in an external-light-shielded region may be further included in addition to the image sensor 110, and image data including noise generated from the image sensor 1410 shielded from external light may be transmitted to the control unit 120.

In addition to a general control function, the sensor control module 121 functions to control the image sensor 111 to extract suitable dark noise by setting at least one parameter among an exposure time for the image sensor 111 and an offset and an amplification ratio of the analog-digital converter 113.

As the exposure time for the image sensor 111 or the amplification ratio (gain) of the analog-digital converter 113 is increased, the number of dark electrons per pixel increases. The exposure time is correlated to the number of frames because a certain time (e.g., 270 ms) is allocated to each frame. In this case, when a unit exposure time for extracting a first random number (a raw random number) and the number of frames are too small, it may be advantageous to employ multiple frames because the extraction slows down due to a relatively small number of electrons.

In FIG. 1, the control unit 120 and the image sensor module 110 are shown as being separated from each other. However, it will be appreciated that all of the above-described functions of the control unit and the sensor control module may be implemented in hardware called an image sensor module and also that a chip with an additional function may be added to functions of a commercially available image sensor module.

The random number extraction module 122 of the control unit 120 generates a first random number (a raw random number) using digital image data received from the image sensor module 110 using a random extraction program. The first random number may also be referred to as a raw random number and is not limited by its name. The random number extraction process will be described in detail below.

The post-processing module 123 operates to improve the randomness of the generated first random number. As described above, an electric current acquired while external light is shielded (dark noise) may be classified as a dark shot noise, and the other noise may be classified as technical noise. Generally, in dark conditions, there are additional noise sources such as readout noise and fixed pattern noise. Such a kind of noise is classified as technical noise once conditions on an apparatus and an environment are fully known.

The post-processing module 123 may function to reduce the technical noise except for the dark shot noise as much as possible and may also determine a removal ratio when the technical noise is intentionally left. That is, in noise distribution including both of the dark shot noise and the technical noise, the post-processing module 123 may perform post-processing to generate a second random number by reducing the technical noise so that the dark shot noise is below a certain level or by removing a certain proportion of the technical noise so that the technical noise is mixed with the dark shot noise by a certain proportion.

Also, according to another expression, the post-processing module 123 performs a process of making the entropy of the first random number generated by the random number extraction module 122 closer to one. Generally, random numbers have better randomness when the entropy approaches one.

The database 130 stores reference values for generating random numbers from dark noise continuously output for each unit pixel over time. The database 130 may or may not be necessary depending on the random number extraction scheme. The database 130 derives reference values in order to pre-measure dark noise distribution of each unit pixel of an image sensor, determine a bit allocated to each pixel using the min-entropy method, and separate the dark noise distribution into a plurality of bins according to the determined bits, and then the database 130 stores the derived reference values.

Meanwhile, noise removal means (not shown) may be added during or after an electric current (a dark noise) in the image sensor module is converted into digital data. Such noise removal means may be implemented to remove noise corresponding to the above-described technical noise. As will be described later, in a random number generation apparatus according to an embodiment of the present invention, the dark shot noise contributes to a main quantum random number, and the proportion of the dark shot noise may be increased when the technical noise is removed as much as possible. By the way, increasing the random number generation rate may be achieved at the cost of decreasing true randomness if the technical noise is not removed.

FIGS. 10 to 14 are diagrams for describing a concept in which a random number extraction module extracts a first random number according to an embodiment of the present invention.

Figure 10:
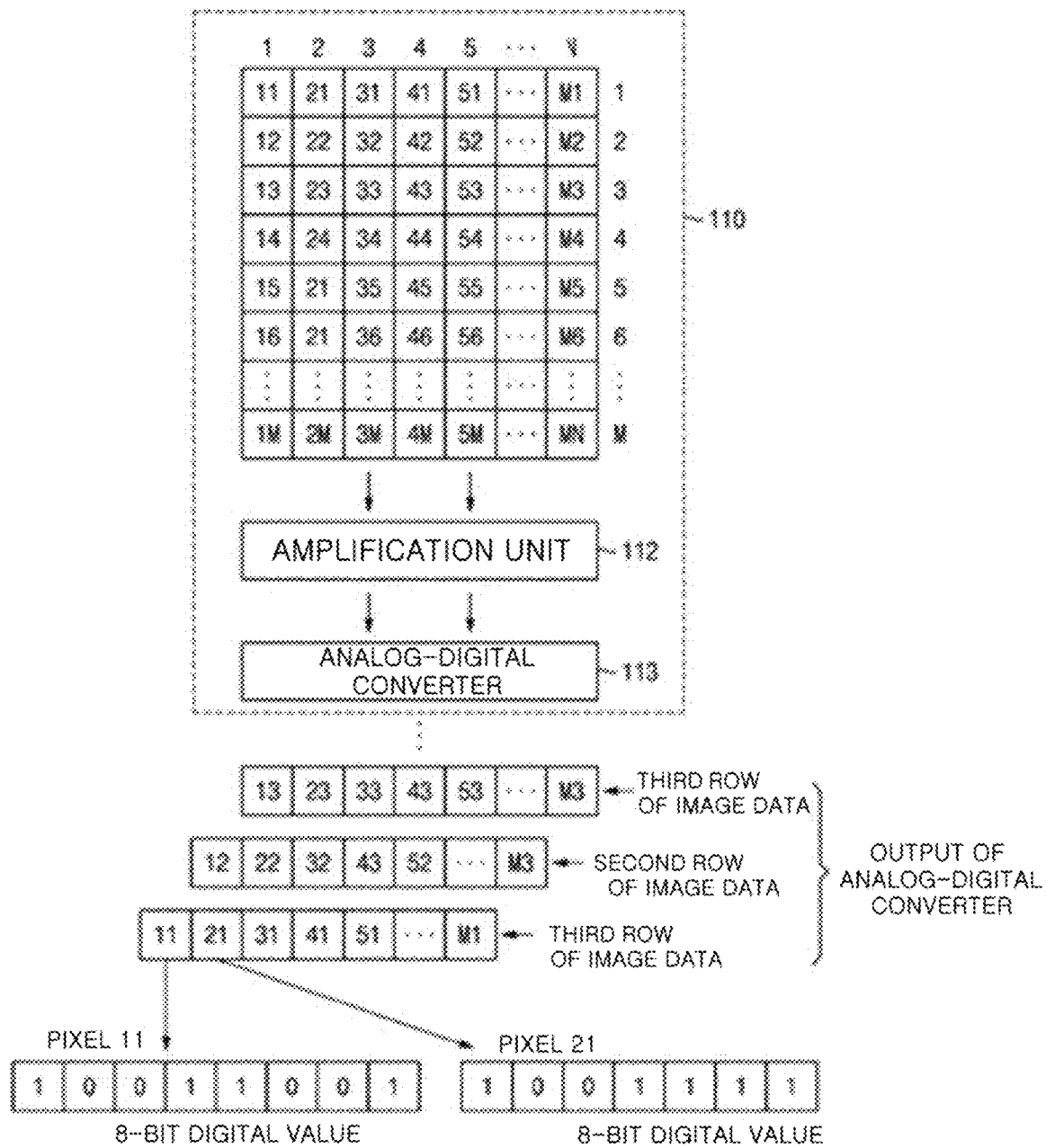
FIGS. 10 to 14 are diagrams for describing a concept in which a random number extraction module extracts a raw random number according to an embodiment of the present invention.

Referring to FIG. 10, an outer portion, a circuit portion, and the like are omitted for convenience of illustration, and only an effective pixel portion is schematically shown. In FIG. 10, the image sensor 110 is shown as an image sensor composed of M×N effective pixels.

A light signal received from the image sensor 110 is converted into a voltage by an internal or external element, is amplified by an amplification unit 112, and is converted into a digital signal by the analog-digital converter 113.

According to a detailed example, the analog-digital converter 113 outputs the digital data as one column unit composed of one to M pieces of the image sensor. The digital data is acquired by digitalizing image data, which is dark noise.

FIG. 10 shows that digital values of pixels 11, 21, 31, 41, 51, . . . , M1 are output as a first row of image data, digital values of pixels 12, 22, 32, 42, 52, . . . , M2 are output as a second row of image data, and digital values of pixels 13, 23, 33, 43, 53, . . . , M3 are output as a third row of image data, sequentially.

Each unit pixel outputs image data corresponding to the dark noise, for example, a digital signal corresponding to one of 256 levels by an 8-bit analog-digital converter 113. Also, FIG. 10 illustrates that, for example, pixel 11 outputs an 8-bit digital value of 10011001 and pixel 21 outputs an 8-bit digital value of 10011111. It will be appreciated that the analog-digital converter 113 may be configured to output digital values having a number of bits, which are not particularly limited, such as 10 bits, 12 bits, and the like.

Figure 11:
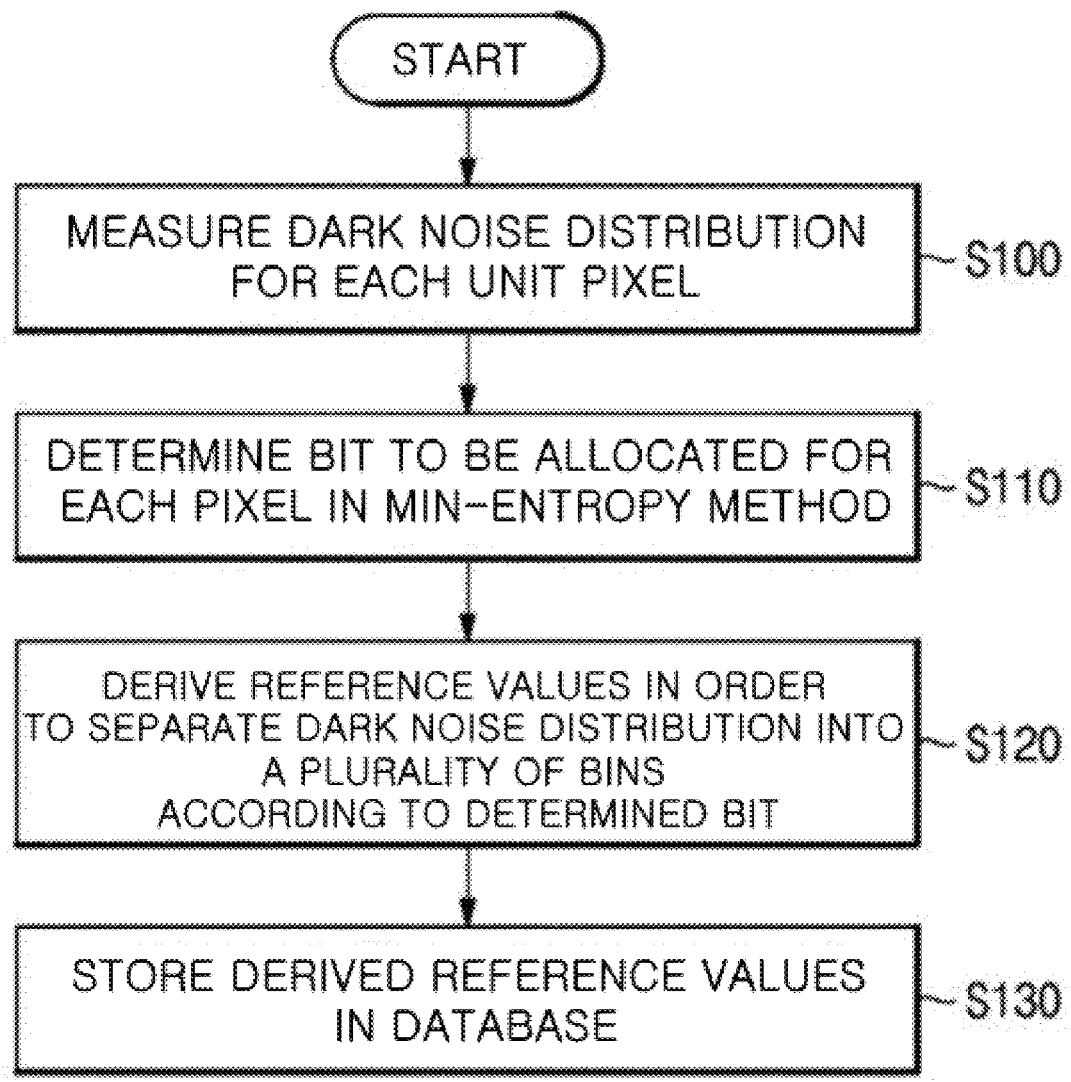
Figures 12, 13:
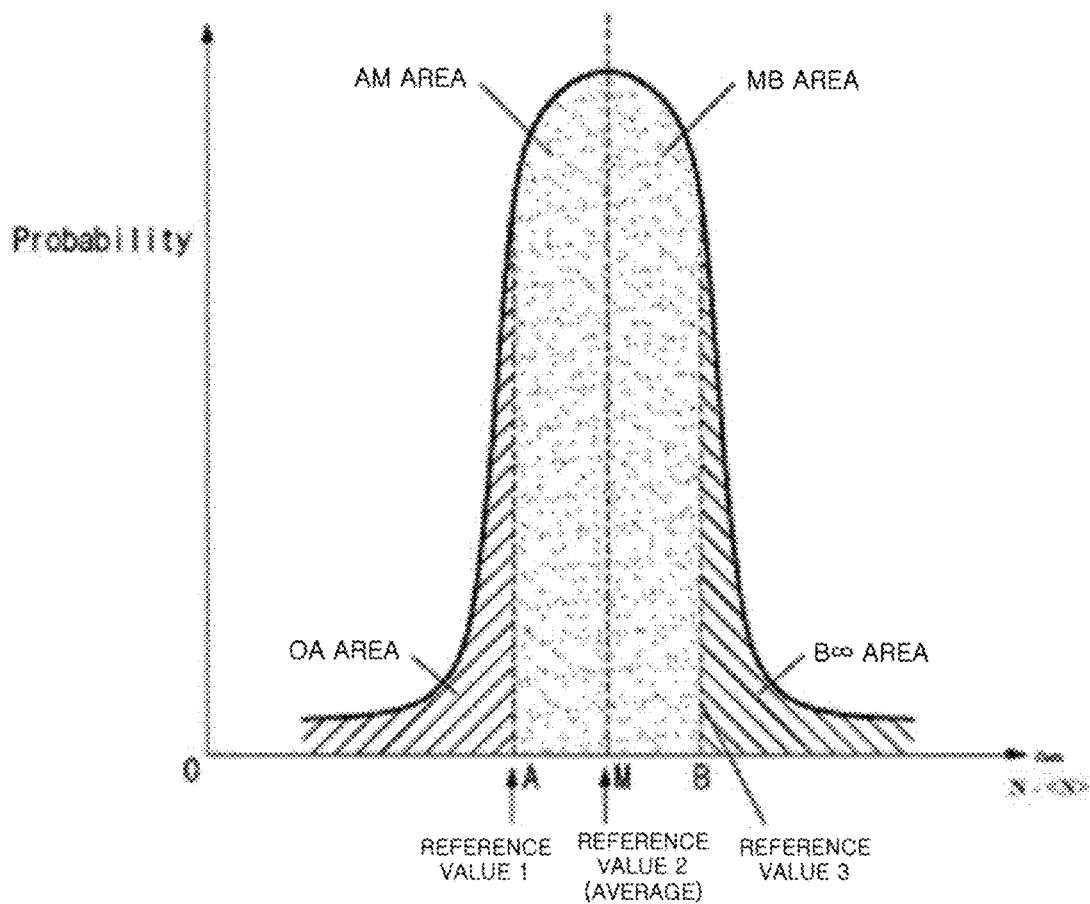

Next, a process of constructing the database 130 used by the random number extraction module to extract the first random number will be described. FIG. 11 is a flowchart showing a process of constructing a database according to an embodiment of the present invention, and FIG. 12 is a graph showing an occurrence frequency according to the number of electrons per unit pixel. The horizontal direction, which indicates the number of electrons, refers to the number of electrons detected for unit time per unit time, and the vertical direction refers to a value obtained by normalizing a frequency probability of the number of electrons.

First, referring to FIG. 11, dark noise distribution is measured for each unit pixel of an image sensor 111 (S100). This process is performed for each unit pixel, and thereby random number generation is performed for each unit pixel. As an example, such a distribution curve is shown in FIG. 12. The dark noise distribution has a constant distribution with respect to the center value. As will be described below, this distribution is known to be formed as the Poisson distribution. In this embodiment, reference values may be derived after the distribution is checked in advance and then may be actually used to generate a random number.

Next, a bit to be allocated to each pixel is determined using the min-entropy method. It should be noted that the process of determining a bit to be allocated for each pixel is not limited to the min-entropy method. Then, when it is assumed that a corresponding optimal bit number is n, the dark noise distribution is divided into 2n bins, and each bin is allocated a corresponding bit random number. For example, when a dark noise sample value is present in bin "00," a raw random number "00" is generated.

The random number extraction module 122 evaluates a value obtained by digitalizing image data for each unit pixel corresponding to a random source using the min-entropy method and determines how many bits will be allocated to each unit pixel. Here, the minimum entropy may be expressed using Equation 1 below:

$$H_{min}(X) = -\log_2\left[\max_{x \in X} P_X(x)\right].$$ [Equation 1]

Here, X is a variable of distribution $P_x(x)$, X represents a random sequence, x represents a sample point, and max $P_x(x)$ represents the maximum value among probabilities of occurrence of a point x of a random source.

The min-entropy method allows quantification and evaluation of the randomness of the first random number distribution and provides a lower limit of binary bits to be extracted from a random source.

Also, in order to convert the dark noise distribution into a binary number with the maximum entropy, the number of sampling bits should be greater than $H_{min}(X)$. That is, when the minimum entropy $H_{min}(X)$ has a value smaller than 2 bits (e.g., 1.8 bits), the sampling bit number may be determined as two bits.

When the sampling bit number is determined as two bits, a 2-bit random number is extracted using the 2-bit sampling bits. In other words, the dark noise distribution is divided into $2^2$ bins, and the bins are allocated to corresponding bit random numbers 00, 01, 10, and 11. For example, when a dark noise sample value is present in bin "01", a raw random number "01" is generated. FIG. 12 illustrates that when a result of evaluating a random source using the min-entropy method is that the optimal bit number is equal to or less than two bits, 2-bit random values are allocated for the noise distribution, as an example.

In this way, after it is determined how many bits will be allocated to each unit pixel, reference values are derived in order to separate the dark noise distribution into a plurality of bins according to the determined bits (S120). Referring to FIG. 12, a process of deriving reference values after it is determined to allocate two bits in the dark noise distribution measured at any unit pixel will be described. For example, in this distribution, an average value M point is designated as one reference value, and two bits are allocated. Thus, only the reference values of A and B may be selected. Accordingly, a point at which an OA area is equal to an AM area in the distribution curve is selected as the point A. Likewise, a point at which an MB area is equal to a B∞ area in the distribution curve is selected as the point B. According to such a scheme, the reference values are determined as A, M, and B. However, the scheme is provided by way of illustration and is not limited thereto.

Next, the reference values for each unit pixel derived in this way are stored in the database 130. Meanwhile, since the above-described process proceeds for each unit pixel, the number of bits allocated to each unit pixel may be different. For example, two bits may be allocated, and also three bits may be allocated. When two bits are allocated, three reference values for a corresponding pixel are stored in the database. When three bits are allocated, seven reference values for a corresponding pixel are stored in the database.

FIG. 13 is a diagram showing an example of the database according to an embodiment of the present invention. FIG. 13 shows that reference values are stored for each unit pixel, for example, that two bits are allocated to pixel 11 and thus three reference values are stored, two bits are allocated to pixel 12 and thus three reference values are stored, and three bits are allocated to pixel 13 and thus seven reference values are stored. It will be appreciated that four bits may be allocated when the number of reference values is 15.

Figure 14:
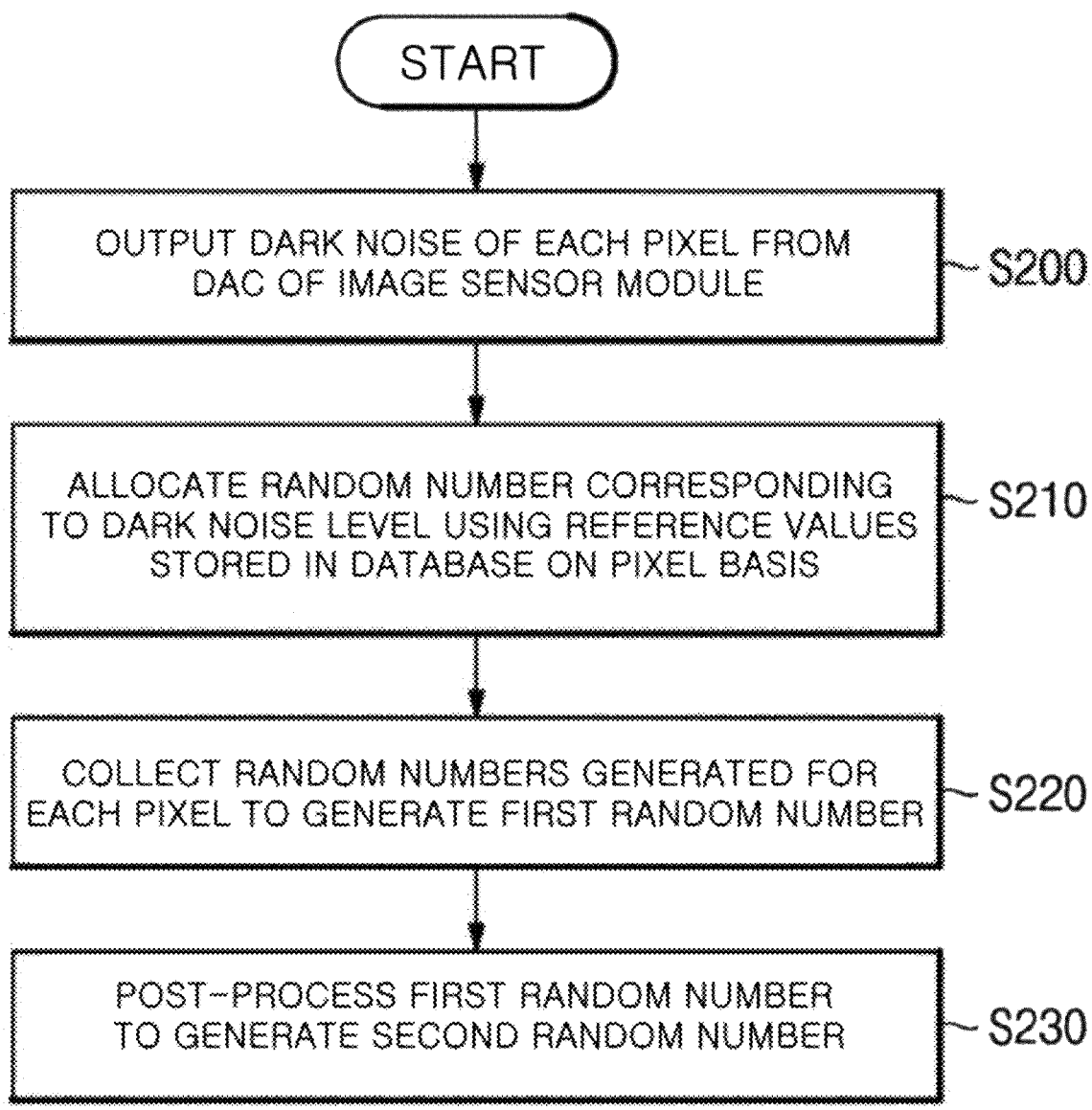

FIG. 14 is a flowchart illustrating a process for describing a concept in which a random number extraction module extracts a first random number using a database according to an embodiment of the present invention.

First, dark noise of each unit pixel is digitalized and output from an analog-digital converter of the image sensor module 110 (S200). A random number corresponding to a corresponding dark noise level is allocated to the output digital data of the unit pixel using reference values of the corresponding unit pixel stored in the database (S210).

For example, as shown in FIG. 13, it is assumed that two bits are allocated to any unit pixel and reference values are derived as A, M, and B and stored in the database. In this case, random number "00" is allocated when the output dark noise level of a unit pixel is smaller than A, random number "01" is allocated when the output dark noise level is between A and M, random number "10" is allocated when the output dark noise level is between M and B, and random number "11" is allocated when the output dark noise level is greater than B.

Through this process, random numbers are generated for all of the unit pixels and collected to generate a first random number (S220). Also, by increasing the number of pixels and a time to collect the random numbers, it is possible to control the number of random numbers. A second random number is generated by post-processing the first random number (S230).

Figure 15:
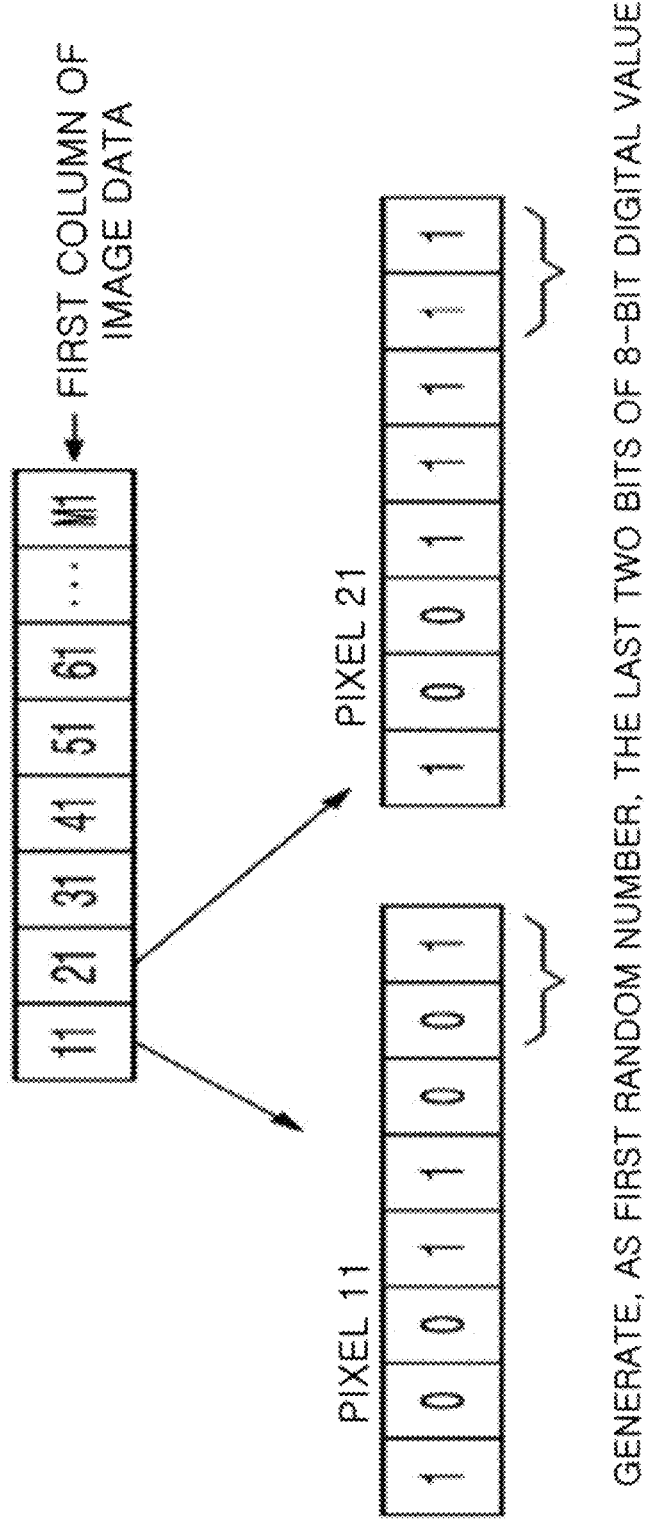
FIG. 15 is a diagram for describing a concept in which a random number extraction module extracts a raw random number according to another embodiment of the present invention.

Next, FIG. 15 is a diagram for describing a concept in which a random number extraction module extracts a first random number according to another embodiment of the present invention.

FIG. 15 shows that data converted into digital data through the analog-digital converter of FIG. 1 is output. As shown in FIG. 15, while 8-bit digital image data is output using the analog-digital converter, the last one to three bits of the digital data value may be extracted as the first random number. Preferably, the last two or three bits of the digital data value may be used as the first random number. This method has an advantage in that the database and the complicated process such as that used in the min-entropy method, which have been described above, are not necessary. In this case, the first random number is directly applied to the post-processing.

The post-processing module 123 functions to post-process the first random number to generate a second random number. Since the first random number may be output with a ratio between 0 and 1 biased to one side, the function is performed to alleviate the bias. Also, in this step, it is possible to obtain an entropy closer to one by removing all or some of the technical noise. In other words, the post-processing step may be configured to remove noise other than the dark shot noise in the noise distribution generated from the image sensor 110 so that the proportion of the dark shot noise is relatively increased.

That is, in noise distribution including both of the dark shot noise and the technical noise, the post-processing module 123 may perform post-processing on the basis of the dark shot noise to generate a second random number by removing a relatively large amount of technical noise or may perform post-processing to generate a second random number while the technical noise is mixed with the dark shot noise by a certain proportion by removing a certain proportion of the technical noise.

The post-processing module 123 performs a statistical test on the random number after the post-processing is performed, and the random number that has passed the statistical test corresponds to the second random number.

The post-processing module 123 may perform post-processing using Von Neumann extractor (XOR corrector), Toeplitz-hashing matrix, Trevisan's extractor, Cryptographic hashing extractor with SHA-512, Whirlpool, or Advanced Encryption Standard (AES).

For example, the Von Neumann extractor divides a bit sequence into a pair of bits and then outputs a predetermined value according to the bit pair. Assuming that no output is made when the bit pair is set to "00" and "11," "0" is output when the bit pair is set to "01," and "1" is output when the bit pair is set to "10," {0101} may be output for {11010010011011}.

Figure 16:
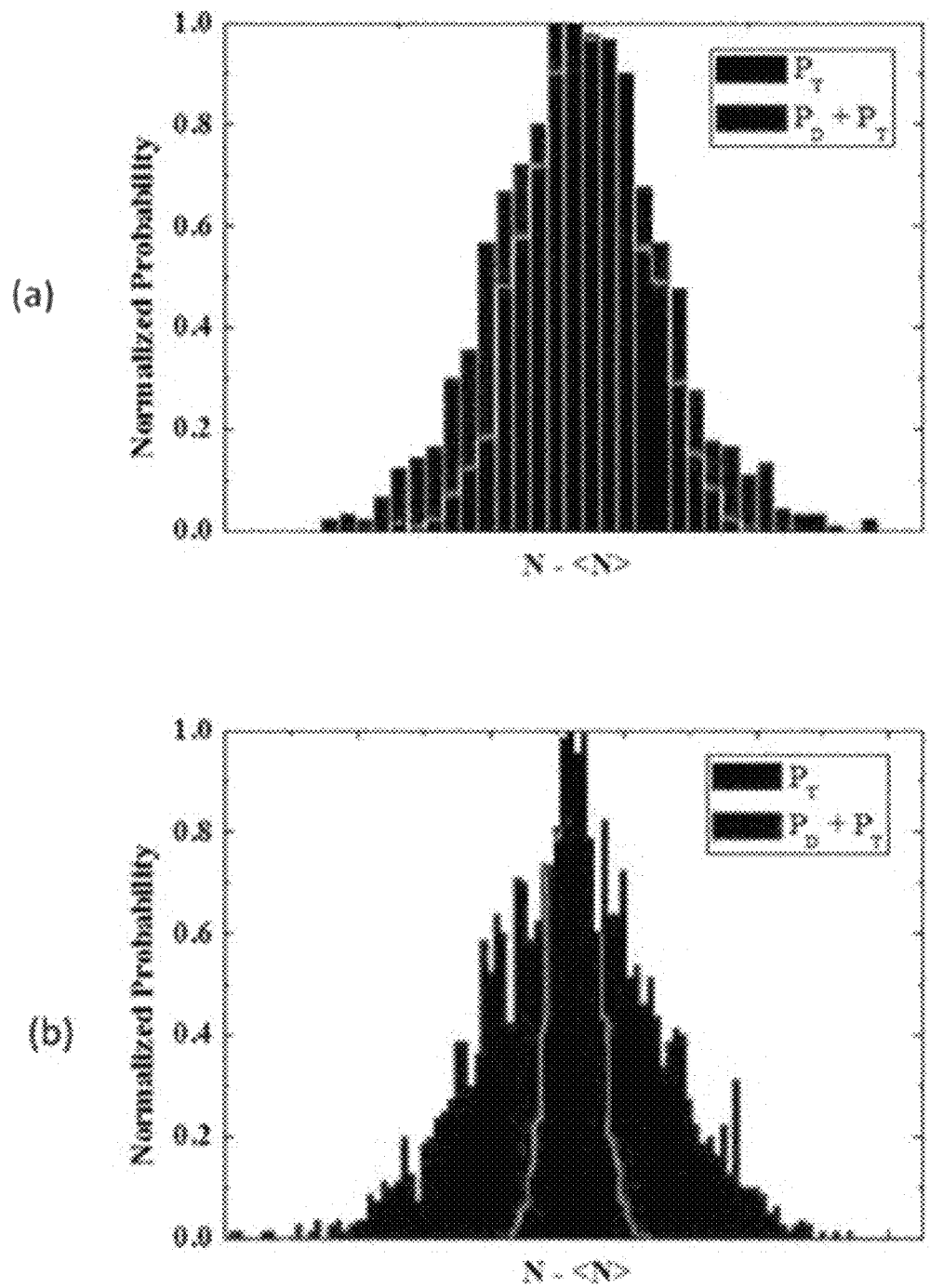
FIG. 16 is a diagram showing distribution of dark shot noise and technical noise according to temperature.

FIG. 16 is a diagram showing distribution of dark shot noise and technical noise according to temperature. Referring to FIG. 16, FIG. 16A represents a distribution of the dark shot noise $P_D$ and the technical noise $P_T$ at room temperature, and FIG. 16B represents a distribution of the dark shot noise $P_D$ and the technical noise $P_T$ at a temperature of 50° C.

Comparing FIG. 16A and FIG. 16B, it can be seen that the distribution of the dark shot noise $P_D$ at the high temperature in FIG. 16B is larger than that of FIG. 16A. This represents that the distribution of the dark shot noise $P_D$ increases as the temperature increases and thus a larger number of random numbers generated on the basis of the dark shot noise $P_D$ in one frame may be extracted.

Also, an exposure time corresponding to the length of time for accumulating an input signal may be easily controlled by the control unit. That is, the sensor control module may set a parameter corresponding to the exposure time to control the exposure time of the image sensor. The dark shot noise $P_D$ increases in proportion to the exposure time, but an actual exposure time is directly associated with a frame rate to affect a random number generation rate.

That is, since the generation of the dark shot noise $P_D$ is affected by the temperature and the exposure time, it is necessary to optimize the temperature and the exposure time. In an embodiment, the temperature may be set to room temperature, and the exposure time may be set to about 270 ms.

The dark noise extracted from the image sensor module 110 of FIG. 1 includes the dark shot noise and the technical noise. A noise reduction unit (not shown) may be employed to decrease the technical noise before the dark noise is input to the random number extraction module 122. The noise reduction unit may be implemented inside the image sensor module or may be implemented in the control unit. Since the dark shot noise is noise with good randomness, a good random number may be extracted when the proportion of the dark shot noise increases.

Figure 17:
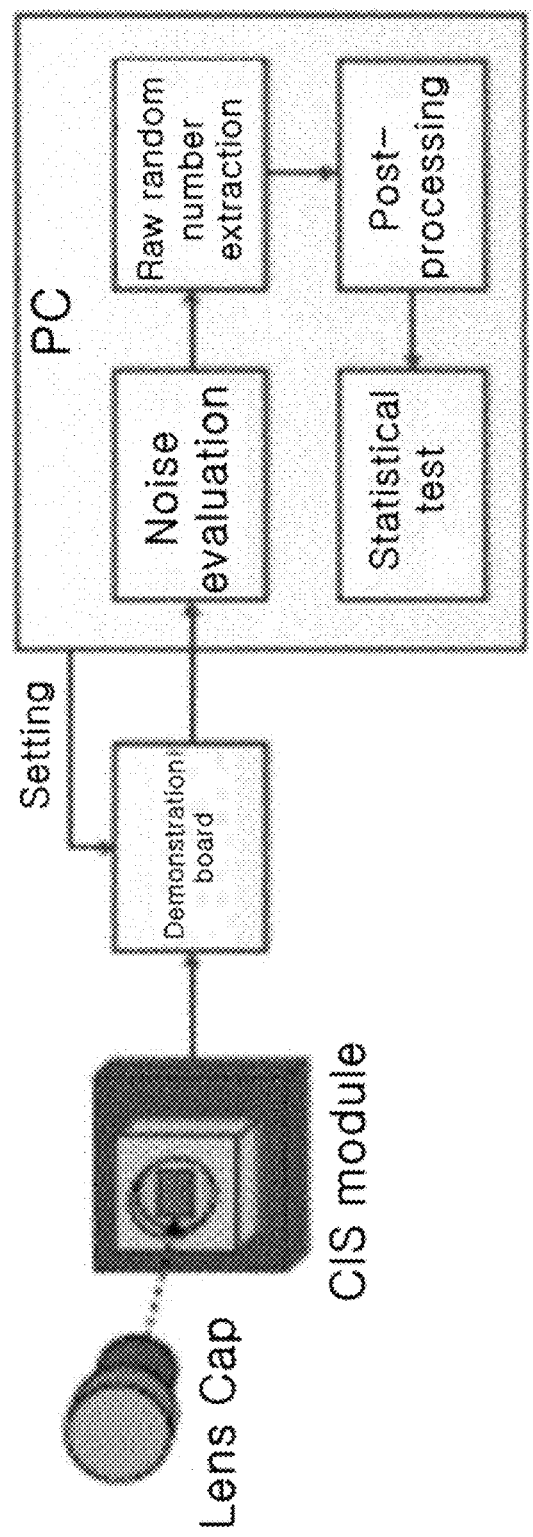
FIG. 17 is a block diagram of an actual implementation of a random number generation system according to the present invention.

Next, an experimental example of the present invention will be described. FIG. 17 is a block diagram showing an example of actually implementing a random number generation system according to the present invention.

As the image sensor (CIS) module, one CIS module PS5100K commercially available from Pixelplus was used. In order to evaluate temperature characteristics, the CIS module was placed in a heating cabinet. In order to make a dark state, a covering method with a lens cover was used. Raw image data was transmitted to a computer, and a command signal for sensor control was delivered from the computer to the CIS module through a demo board.

In the PC, first, image data of each pixel was statistically analyzed. Subsequently, a random number was extracted in an efficient manner based on an analysis result of a random number extraction unit. Next, some of the following algorithms were executed in a post-processing block in order to improve randomness and make an available data format. In this experiment, the functions were implemented in PC software, but the CIS module may be programmed to perform the functions. Last, a statistical test block analyzed characteristics of the random number.

An image sensor was composed of a 1280×720 active pixel array, a dummy pixel, and a peripheral circuit. Since the lens cover was used for the covering, all the pixels may be used as a random number source. Actually, there are dummy pixels having a black material or metal layer that is intrinsically and optically black. Such pixels may be random sources even when no lens cover is present.

In this experiment, a thermal noise reduction circuit minimized a readout noise level to less than two electrons in order to successfully resolve the dark shot noise. Also, an analog noise level was converted into a digital value by a 10-bit analog-digital converter. The analog-digital converter may provide an analog gain and thus may accurately process the noise level. The control of the exposure time, gain, and frame rate may be performed by simple register settings implemented in a chip.

First, since the dark noise characteristics of the CMOS image sensor are main random number sources, the characteristics of the dark noise were examined. Rationally, all the pixels were evaluated by using image data obtained in a dark state in which an analog gain and an integration time of 270 ms were acquired.

Figure 18:
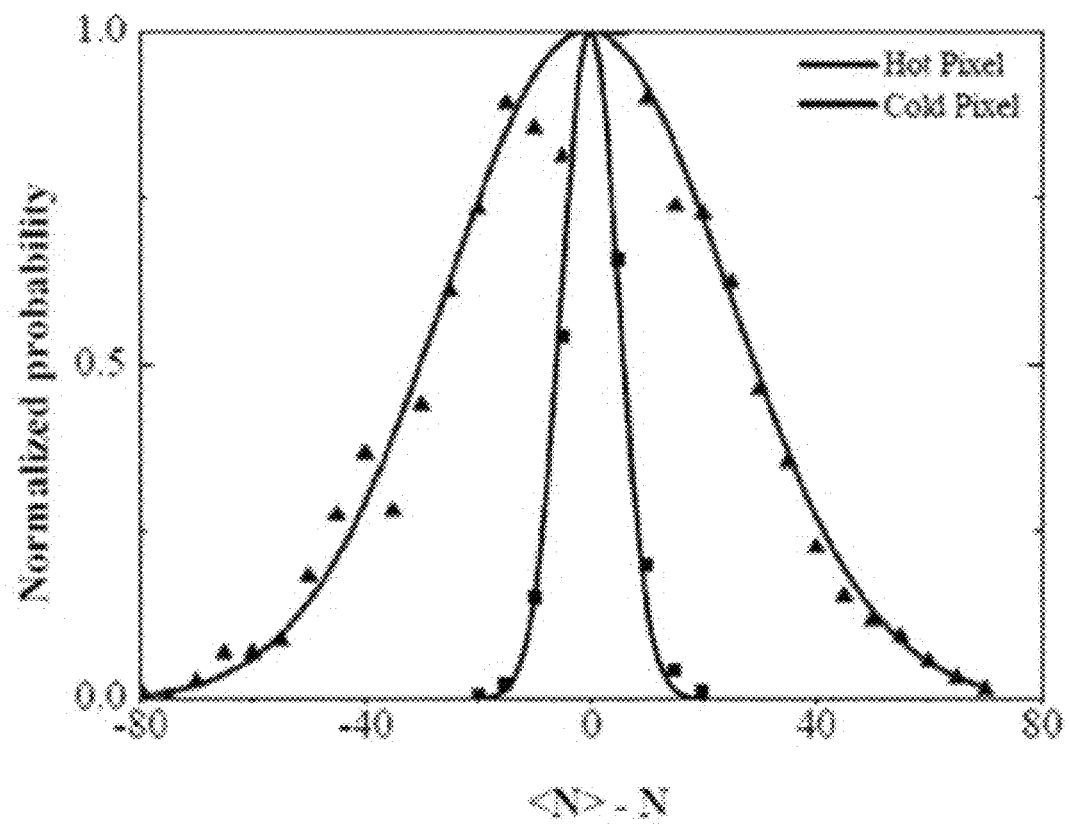
FIG. 18 shows normalized noise distribution of hottest pixels and coldest pixels measured at room temperature according to an experimental example of the present invention.

FIG. 18 shows normalized noise distribution of hottest pixels and coldest pixels measured at room temperature according to an experimental example of the present invention.

A hot pixel refers to a pixel with a high dark current, and a cold pixel refers to a pixel with a low dark current. Approximately, the dark current of the hot pixel is four times greater than the dark current of the cold pixel. As expected, the dark current of the hot pixel has a much higher deviation than the dark current of the cold pixel. To increase a random number generation rate, a pixel with a high dark current deviation is preferable. However, actually, multiple pixels do not exhibit high dark currents in conventional complementary metal oxide semiconductor (COMS) image sensors. Accordingly, random numbers were generated with cold pixels and then analyzed.

As described above, the dark noise includes the dark shot noise and the technical noise. Even a low level of noise has technical noise minimized almost to the level of several electrons owing to innovations in readable circuitry, and thus the dark shot noise is regarded as a dominant random noise source.

Figure 19:
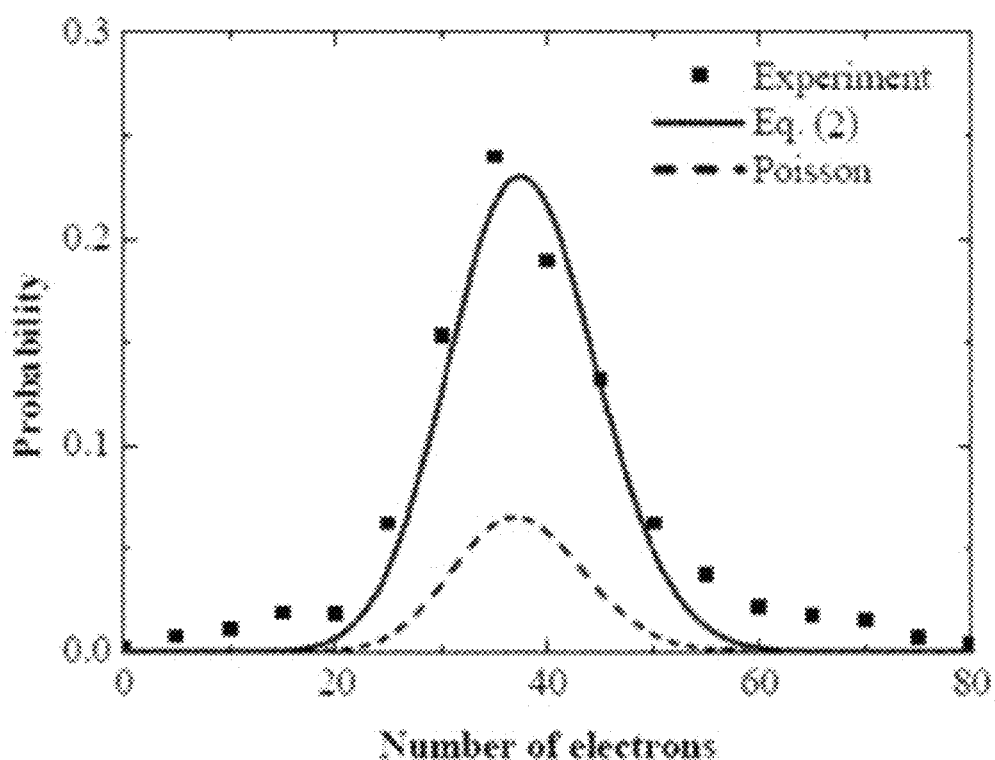
FIG. 19 shows an experimental dark noise probability distribution of one cold pixel according to an experimental example of the present invention.

FIG. 19 shows an experimental dark noise probability distribution of one of the cold pixels according to an experimental example of the present invention.

Referring to FIG. 19, the dotted line data shows the Poisson distribution, the rectangular points indicate experimental values, and the solid line shows Equation 2 below. However, in contrast to the fact that the dark shot noise has the Poisson distribution, the experimental values were found to differ from the Poisson distribution.

This can be explained by the fact that an analog-digital converter of a CMOS image sensor can not usually resolve a single-electron level. In other words, a least significant bit (LSB) of raw image data indicates signal levels of a plurality of electrons. Therefore, the probabilities of the plurality of electrons should be accumulated to indicate the probability of the LSB as formulated in Equation 2.

$$P_s(N) = \sum_{n=N-\frac{l}{2}}^{n=N+\frac{l}{2}} \frac{\bar{n}^n e^{-\bar{n}}}{n!}.$$ [Equation 2]

Here, $P_s(N)$ indicates a noise probability of a raw image using an analog-digital converter. In this case, the resolution of the LSB is 1 electrons, and n and $\bar{n}$ indicate the number of electrons and the average number of electrons, respectively.

In FIG. 19, since the LSB indicates three electrons and an average digital value of the dark pixel is 7.7 in a test sensor, the solid line is drawn by applying 23 to $\bar{n}$ and applying 3 to 1.

This shows that the experimental probability distribution of the dark noise in the cold pixel follows the probability of Equation 1. This indirectly proves that the noise distribution is the Poisson distribution from each dark electron and thus means that the dark shot noise is a dominant noise source.

In order to estimate the number of random bits extracted from the dark noise, the minimum entropy is used. The minimum entropy provides a lower limit of a binary bit that may be extracted from a random source. The minimum entropy may be expressed using Equation 3 below:

$$H_{min}(X) = -\log_2\left[\max_{x \in X} P_X(x)\right].$$ [Equation 3]

Here, X is variable depending on distribution $P_X(x)$. This quantifies the randomness of the distribution. In order to convert the random distribution into a binary distribution having the maximum entropy, the conversion rate should be greater than $H_{min}(X)$.

The probability distribution of the dark noise at room temperature may be converted into a random number of about 1.8 bits in a test pixel. So, a 2-bit random number was extracted. In other words, the noise distribution was divided into $2^2$ bins, and the bins were allocated to 2-bit random numbers "00," "01," "10," and "11," When a noise sample value is present in bin "01," a raw random number "01" is generated.

Using Equations 2 and 3, the maximum random bit number extractable through the average number of dark electrons was calculated. By increasing the average number of dark electrons, the noise distribution becomes wider, and also the maximum probability value of the noise distribution decreases.

FIG. 20A is a graph showing a relation between the number of electrons and the maximum value of noise distribution according to an experimental example of the present invention, and FIG. 20B is a graph showing extractable bits corresponding to the number of electrons.

Figure 20:
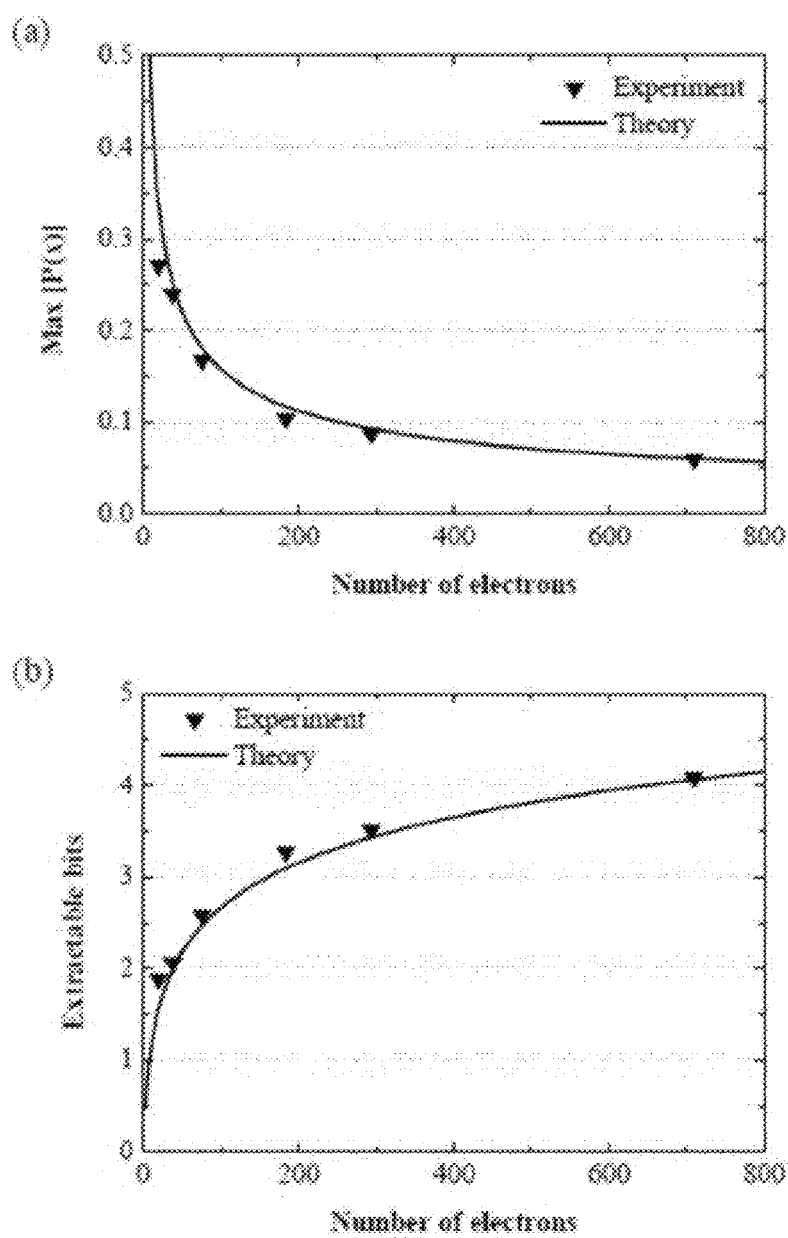
FIG. 20A is a graph showing a relation between the number of electrons and the maximum value of noise distribution according to an experimental example of the present invention.
FIG. 20B is a graph showing extractable bits corresponding to the number of electrons.

The maximum value of the noise distribution is inversely proportional to the average number of dark electrons. Also, a variation range of the noise distribution is shown to be related to the extractable random bits. Also, the inventors experimented and evaluated the noise distribution at various average numbers of dark electrons using the temperature control of the CIS chip. FIG. 20 shows that experimental values (dots) match calculated values (line) well. A raw random string was generated using an average number of dark electrons, i.e. 30 dark electrons, at room temperature. Ideally, when all the pixels were used in the CIS chip, a raw random number generation rate of up to about 6.8 Mbps itself could be achieved.

NIST SP800-90B (SP800-90B (January 2016 Draft Publication with full announcement details: http://csrc.nist.gov/publications/PubsDrafts.html#800-90B) was used in order to estimate the entropy of the dark noise.

Also, SP800-90B is classified as a key standard for RNG security because it is an international standard for RNG security and uses the Cryptographic Module Validation Program (CMVP).

SP800-90B is the second draft and thus uses general methods of the first draft and the second draft, such as the most common value (MCV), collision estimation, Markov estimation, and compression estimation. The minimum entropy of the raw dark noise is determined by the minimum value among MCV, collision, Markov, and compression in SP800-90B. The minimum entropy of the raw random number is estimated.

Non-independent and identical distribution is determined as the raw dark noise by SP800-90B. Table 1 shows the entropy density of the raw dark noise. Also, a random number generated by the LSB was extracted for each pixel. The results are shown in Table 2. The minimum entropies of the two cases are 0.64 and 0.85.

TABLE I

ENTROPY DENSIFY OF RAW DARK NOISE SOURCES

| Raw data | MCV | Collision | Markov | Compression |
|---|---|---|---|---|
| Sample 1 | 0.94919 | 1 | 0.64962 | 1 |
| Sample 2 | 0.95100 | 1 | 0.64327 | 1 |
| Sample 3 | 0.95012 | 1 | 0.64698 | 1 |
| Sample 4 | 0.94877 | 1 | 0.64771 | 1 |
| Sample 5 | 0.94981 | 1 | 0.65106 | 1 |
| Sample 6 | 0.94735 | 1 | 0.64802 | 1 |
| Sample 7 | 0.94854 | 1 | 0.64518 | 1 |
| Sample 8 | 0.95193 | 1 | 0.64780 | 1 |
| Sample 9 | 0.94726 | 1 | 0.64694 | 1 |
| Sample 10 | 0.94732 | 1 | 0.64474 | 1 |

TABLE II

ENTROPY DENSIFY OF RAW DARK NOISE SOURCES EXTRACTED BY LSB

| Raw data | MCV | Collision | Markov | Compression |
|---|---|---|---|---|
| Sample 1 | 0.97571 | 0.94471 | 0.96733 | 1 |
| Sample 2 | 0.97571 | 0.94471 | 0.96733 | 1 |
| Sample 3 | 0.97571 | 0.94471 | 0.96733 | 1 |
| Sample 4 | 0.97571 | 0.94471 | 0.96733 | 1 |
| Sample 5 | 0.97571 | 0.94471 | 0.96733 | 1 |
| Sample 6 | 0.97571 | 0.94471 | 0.96733 | 1 |
| Sample 7 | 0.97571 | 0.94471 | 0.96733 | 1 |
| Sample 8 | 0.97571 | 0.94471 | 0.96733 | 1 |
| Sample 9 | 0.97571 | 0.94471 | 0.96733 | 1 |
| Sample 10 | 0.97571 | 0.94471 | 0.96733 | 1 |

Post-Processing—Universal Hashing & HMAC

The post-processing step is to reduce the bias of the raw data and to change the distribution of the raw data to a uniform distribution. Accordingly, the post-processing step increases the entropy densities of the noise sources. In an embodiment, the universal hashing (Hankel matrix), which is theoretically proven information and a Hash-based message authentication code (HMAC) approved as a post-processing function by the CMVP are used. By comparing the post-processing results acquired by the two methods, the validity of the Hankel matrix post-processing is checked for the CMVP.

Hankel Matrix Post-Processing

The universal hashing and a Trevisan's extractor are information-theoretically proven and representatively used for post-processing. However, the implementation of the Trevisan's extractor is more complicated than the universal hashing, and thus the universal hashing (Hankel matrix) is selected as post-processing means. In this case, the leftover hash lemma ensures that the result of the post-processing has a full entropy The HMAC post-processing is approved by the CMVP. By SP800-90B, the HMAC post-processing has different input entropy levels for generating a full entropy random sequence according to a raw hash (FI PS-approved hash). SHA-256 is known as an efficient hash function and thus is used as a primitive of the HMAC. Also, this method ensures that a random sequence generated using the following equation is a full entropy.

$$\text{Input Entropy Level Length} \geq \text{of output of HMAC} \times 2 \quad \text{[Equation 4]}$$

For example, when SHA-256 is used as a primitive HMAC, an entropy of 512 bits or more should be input in order to generate a full entropy of 256 bits. Also, since the entropy density of the raw dark noise is about 0.64 entropies per bit, raw dark noise of 1,440 bits or more should be input by the following approximate equation.

$$\text{Input Length} \times \text{Entropy Density} = \text{Input Entropy Level} \quad \text{[Equation 5]}$$

The entropy density of the dark noise was estimated using an SP800-90B python code provided by the National Institute of Standards and Technology (NIST). For experimental accuracy, when there are one million samples in each subset, 10 sub-sets of raw data were constructed. Table 3 and Table 4 show the experiment result.

TABLE III

RESULTS OF EXPERIMENT CORRESPONDING TO POST-PROCESSING

| Raw data | Raw dark noise | Hankel matrix | HMAC |
|---|---|---|---|
| Sample 1 | 0.64962 | 0.99408 | 0.99469 |
| Sample 2 | 0.64327 | 0.99441 | 0.99440 |
| Sample 3 | 0.64698 | 0.99684 | 0.99474 |
| Sample 4 | 0.64771 | 0.99411 | 0.99630 |
| Sample 5 | 0.65106 | 0.99637 | 0.99552 |
| Sample 6 | 0.64802 | 0.99454 | 0.99588 |
| Sample 7 | 0.64518 | 0.99576 | 0.99270 |
| Sample 8 | 0.64780 | 0.99531 | 0.99524 |
| Sample 9 | 0.64694 | 0.99476 | 0.99508 |
| Sample 10 | 0.64474 | 0.99477 | 0.99579 |

TABLE IV

RESULTS OF EXPERIMENT FOR LSB_2 BITS

| Raw data | Raw dark noise | Hankel matrix | HMAC |
|---|---|---|---|
| Sample 1 | 0.94417 | 0.99343 | 0.99617 |
| Sample 2 | 0.94417 | 0.99343 | 0.99617 |
| Sample 3 | 0.94417 | 0.99343 | 0.99617 |
| Sample 4 | 0.94417 | 0.99343 | 0.99617 |
| Sample 5 | 0.94417 | 0.99343 | 0.99617 |
| Sample 6 | 0.94417 | 0.99343 | 0.99617 |
| Sample 7 | 0.94417 | 0.99343 | 0.99617 |
| Sample 8 | 0.94417 | 0.99343 | 0.99617 |
| Sample 9 | 0.94417 | 0.99343 | 0.99617 |
| Sample 10 | 0.94417 | 0.99343 | 0.99617 |

The experiment result shows that the entropy density of the post-processing sequence by the Hankel matrix is about 0.993 or more. Considering that SP800-90B is conservative, it can be said that the result of post-processing provides a full entropy.

Figure 21:
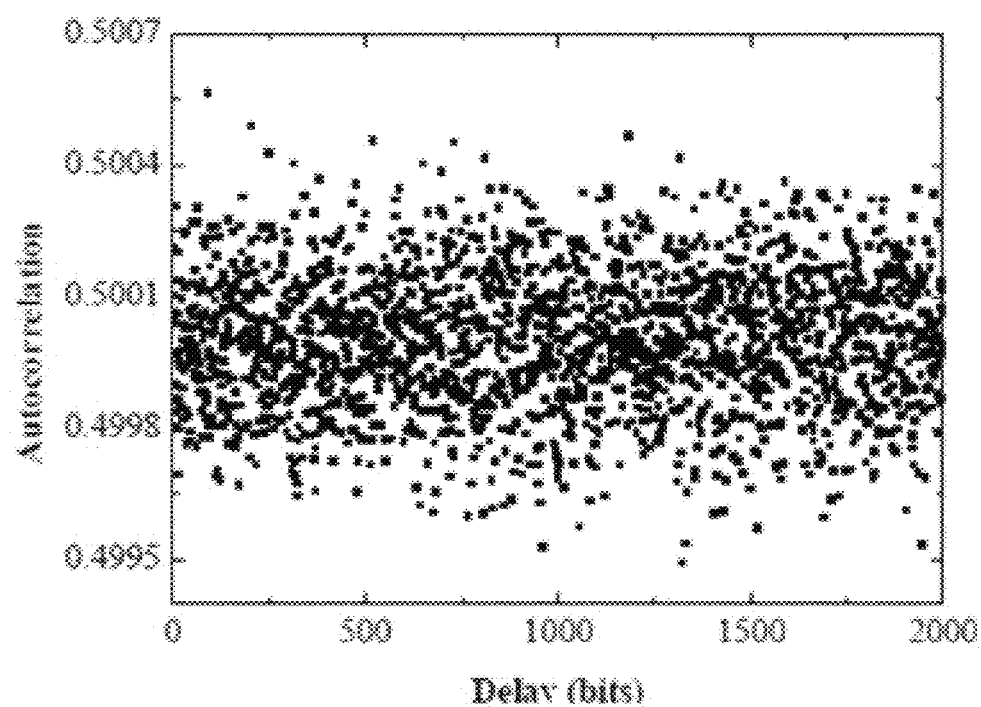
FIG. 21 shows autocorrelation for measuring a serial correlation in an output sample according to an experimental example of the present invention.

FIG. 21 shows autocorrelation for measuring a serial correlation in an output sample according to an experimental example of the present invention.

Autocorrelation for measuring a serial correlation in an output sample was tested. It was found that when a 10 Mbit output random string and a string obtained by delaying the random string by n bits are applied, a spike was not observed. Referring to FIG. 21, the autocorrelation was calculated using a delay function ranging from 1 to 2000. The standard deviation of the autocorrelation was about $1.56 \times 10^{-4}$, which means that there is no particular correlation.

Figure 22:
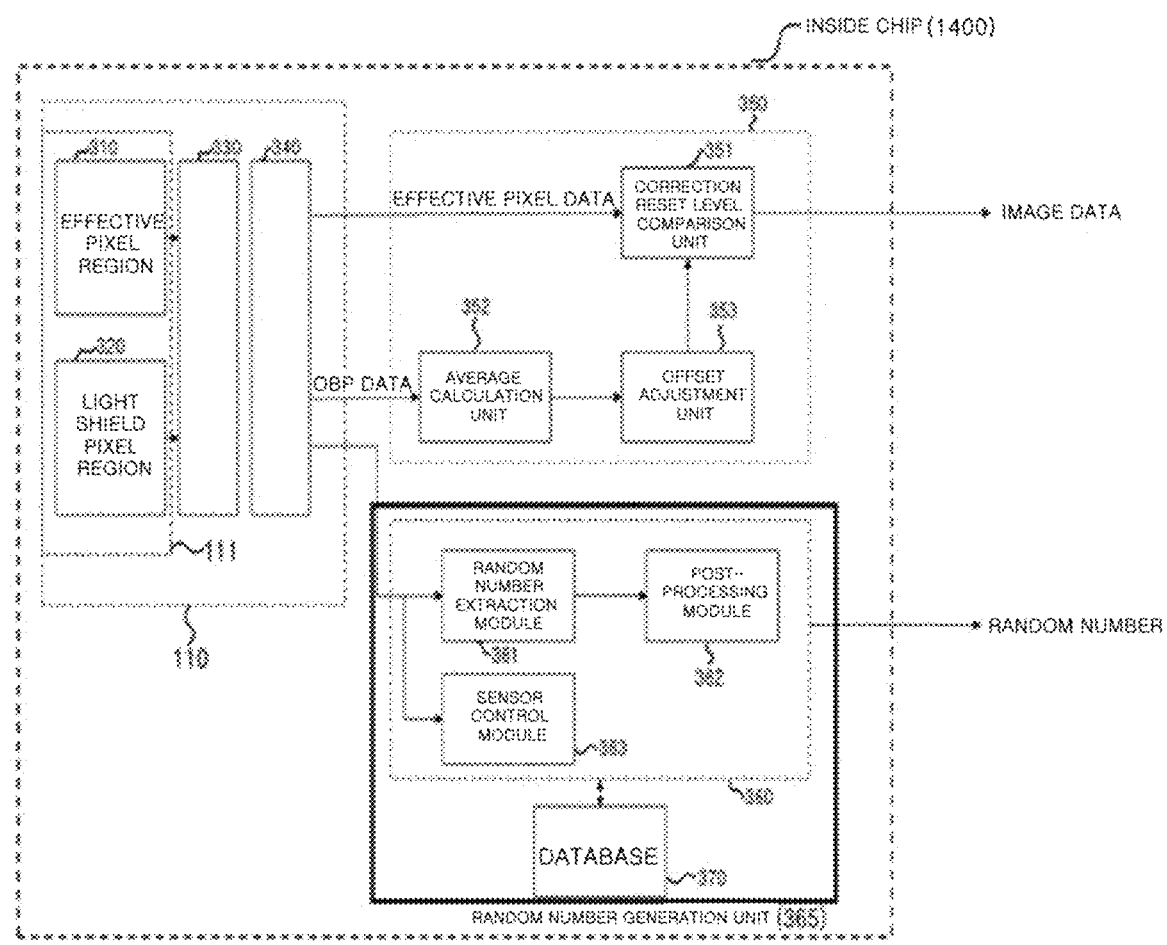
FIGS. 22 to 27 are block diagrams of various random number generation systems for generating a random number according to an embodiment of the present invention.

FIG. 22 is a block diagram of a random number generation system that generates a random number using a light shield pixel region according to an embodiment of the present invention.

FIG. 22 shows that an image sensor module 110, a level adjustment unit 350, a random number generation control unit 360, and a database 370 are included in a single chip. The single chip means that the image sensor module 110, the level adjustment unit 350, the random number generation control unit 360, and the database 370 are integrated on a single semiconductor substrate in addition to a circuit unit for performing such functions. This chip may be installed on a printed circuit board. The chip has a chip pad electrically connected to an external terminal of the printed circuit board through bond wires.

The image sensor module 110, which is a device for converting an external optical image signal into an electric image signal, generates image data with noise. The generated image data is converted into a digital signal and then output by means of an amplifier 330 and an analog-digital converter 340. In this case, image data of a subject is generated from an effective pixel region 310 and output as digital data, which is represented as effective pixel data. Also, dark noise is generated from a light shield pixel region 320 and converted into digital data, which is represented as optical black pixel (OBP) data.

Generally, an image signal level output by an image sensor is determined by a difference between a reset signal level and a signal level corresponding to a charge quantity stored in a photodiode. However, when a high-luminance subject is imaged, a large number of photoelectrons suddenly enter the photodiode, and thus some photoelectrons overflow in the photodiode. In this case, the overflowing photoelectrons lower a reset signal level of the image sensor. Accordingly, there arises a problem of the image signal level of the high-luminance subject output by the image sensor being lower than the actual image signal level of the high-luminance subject. In order to prevent this problem, the level compensation unit 320 corrects the reset signal level of the effective pixel data by using the effective pixel data and the OBP data. It should be understood that FIG. 4 is provided as an example in which the OBP data is used.

More specifically, an average calculation unit 352 receives the OBP data, calculates and outputs an average value, and an offset adjustment unit 353 performs a function of adjusting the level of the average value of the OBP data levels and outputting the adjusted level to a correction reset level output unit 351. According to a result of comparing effective pixel data levels to the average value of the OBP data signal levels, the correction reset level output unit 351 corrects the effective pixel data levels to output the corrected image data levels.

The level compensation unit 350 operates in response to analog output signals directly generated by the sensors or analog and/or digital signals derived from the output signals such as a digital image signal generated by the analog-digital converter 340.

Random number generation units 360 and 370 receive the OBP data to generate random numbers. Each of the random number generation units 360 and 370 includes a random number extraction module 122, a sensor control module 121, a post-processing module 123, and a database 370. The detailed generation process has already been described above, and a description thereof will be omitted here.

FIG. 22 shows that an image sensor module 110, a level adjustment unit 350, a random number generation control unit 360, and a database 370 are included in a single chip 1400. Here, the single chip 1400 may be an image sensor module itself and may be produced in the form of a separate module and connected to an image sensor module. When the chip 1400 is an image sensor module, the chip 1400 may be implemented in a microprocessor chip of the image sensor module. In this case, the microprocessor chip is implemented to perform the above-described series of steps.

Figure 23:
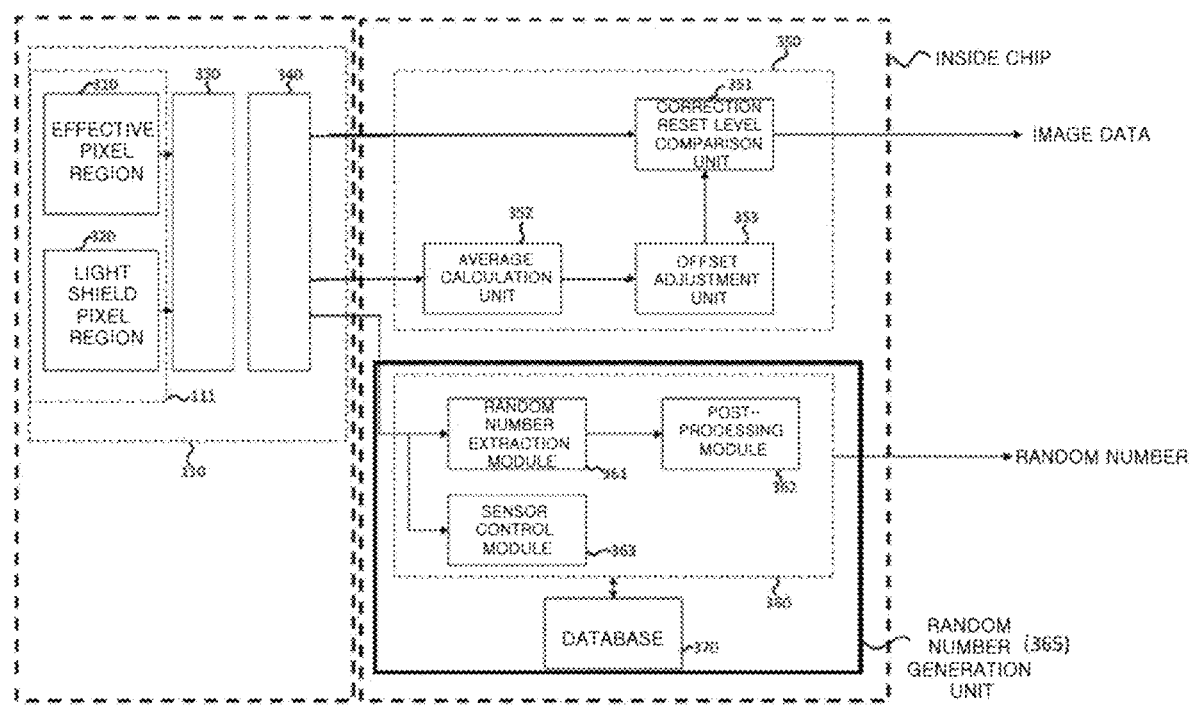

FIG. 23 is a block diagram of a random number generation system that generates a random number using a light shield pixel region according to another embodiment of the present invention.

FIG. 23 shows that a semiconductor chip having an image sensor module 110 and a semiconductor chip having a level adjustment unit 350, a random number generation control unit 360, and a database 370 are separately provided. The functions of the elements of FIG. 23 are similar to those of FIG. 22, and thus a detailed description thereof will be omitted. The single chip means that implementation is made by additionally integrating a circuit unit for performing related functions on a single semiconductor substrate, and this chip may be installed on a printed circuit board. The chip has a chip pad electrically connected to an external terminal of the printed circuit board through bond wires.

Figure 24:
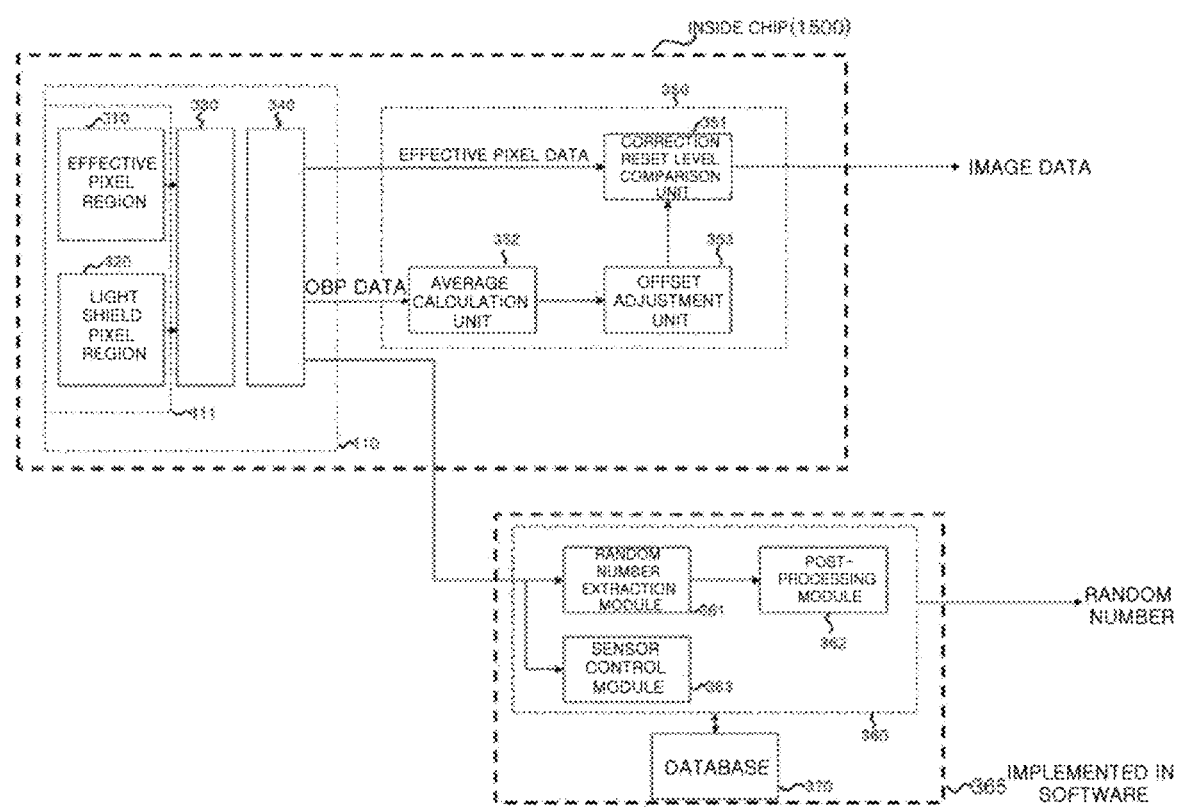

FIG. 24 is a block diagram of a random number generation system that generates a random number using a light shield pixel region according to still another embodiment of the present invention.

The following description will focus on differences from FIG. 22. A random number generation unit 365 is implemented not in the form of a chip but in software or as a separate chip. Fundamental functions are similar in both the cases. The random number generation unit 365 includes a random number extraction module 122, a sensor control module 121, a post-processing module 123, and a database 370.

In an embodiment, the image sensor module 110 and the level adjustment unit 350 are provided and implemented as a single chip 1500, and the random number generation unit 365, which is an element for acquiring dark noise (OBP data) generated from the light shield pixel region 320 and generating a random number, is separately provided in a separate chip. The separate chip refers to another chip that is different from the above-described chip including the image sensor module 110 and the level adjustment unit 350. In another embodiment, the image sensor module 110 may be implemented in the form of a single chip, and the level adjustment unit 350 and the random number generation unit 365 may be provided as their respective chips. In still another embodiment, the function of the random number generation unit 365 may be implemented in software. For example, a mobile device, such as a cellular phone, equipped with an image sensor module may acquire dark noise (OBP data) generated from a light shield pixel region 320 in the image sensor module, deliver the acquired dark noise to a processor inside or outside the mobile device, and generate a random number using the processor. In this case, separate security means such as an encryption process, a decryption process, and the like may be additionally provided to prevent the OBP data for generating a random number or data at an intermediate stage of random number processing from being hacked. Here, the software may be either a program installed in the mobile device by default or a specific application associated with the random number generation method downloaded from the outside via a network. For example, a function of generating a random number by acquiring dark noise (OBP data) generated from the light shield pixel region 320 at the time of manufacturing a cellular phone may be installed in the cellular phone in the form of a chip or in a software form.

Figure 25:
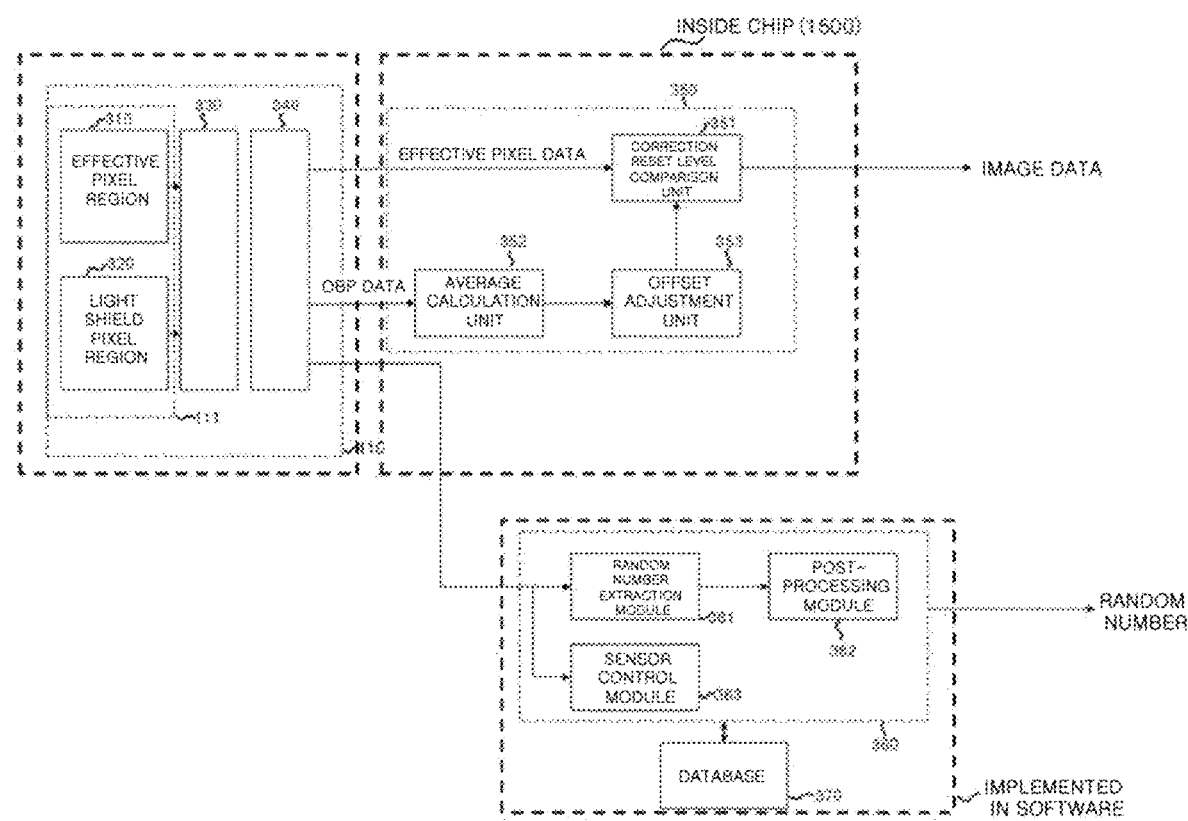

FIG. 25 is a block diagram of a random number generation system that generates a random number using a light shield pixel region according to still another embodiment of the present invention.

The following description will focus on the difference from FIG. 24. FIG. 25 shows that the image sensor module 110 and the level adjustment unit 350 are implemented as their respective chips, and the random number generation unit 365 is implemented not in the chip but in software or as a separate chip. Fundamental functions are similar in both of the cases. The random number generation unit 365 includes a random number extraction module 122, a sensor control module 121, a post-processing module 123, and a database 370.

Figure 26:
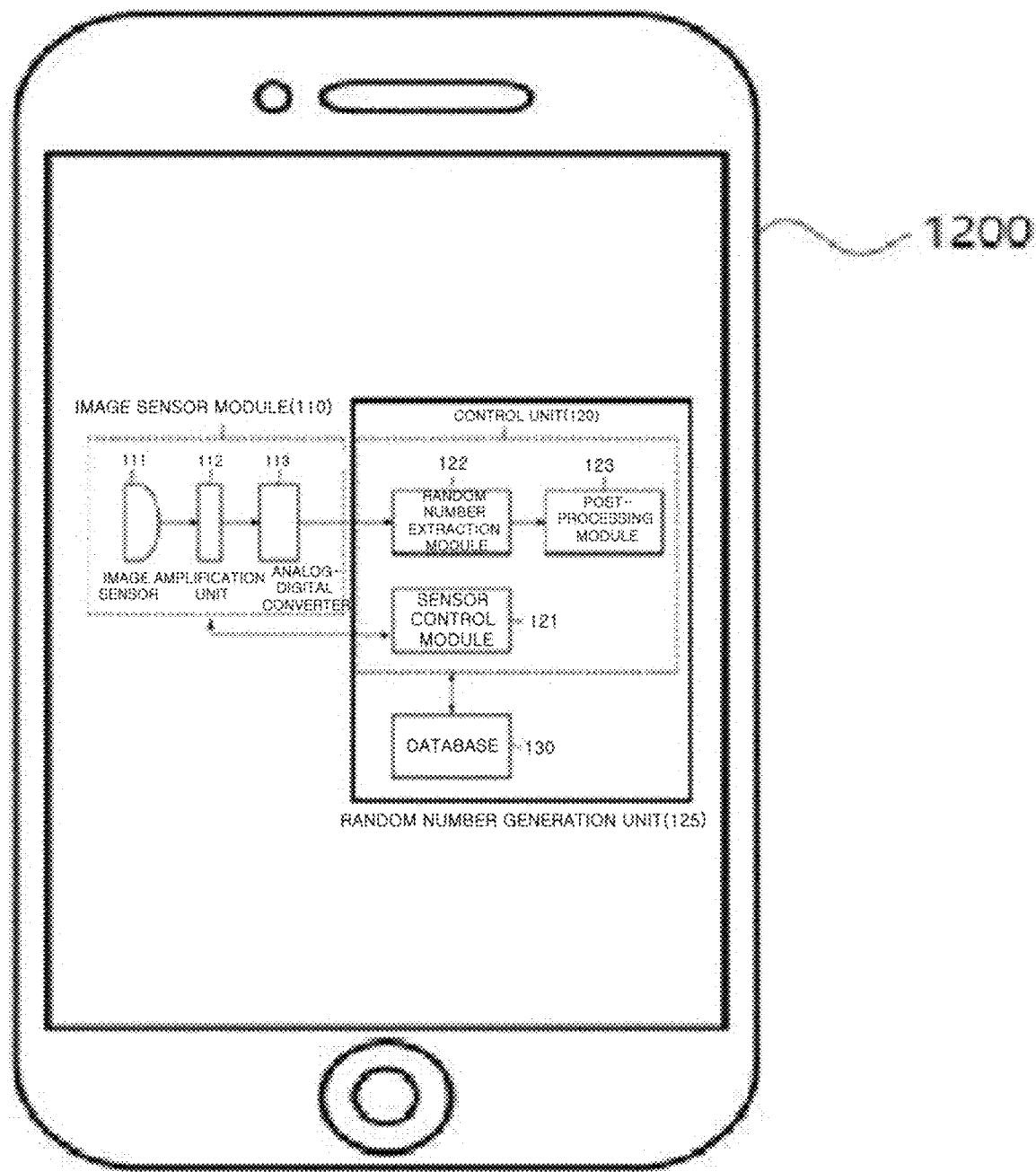

Next, various examples of implementing the random number generation system of the present invention will be described. FIG. 26 is an example diagram showing that the random number generation system is applied to an electronic device according to an embodiment of the present invention.

The electronic device should be understood as a broad concept, which includes devices such as a gaming console, a digital camera, and the like in addition to mobile devices such as a cellular phone. Referring to FIG. 26, a function of performing the random number generation method according to the present invention is installed in an electronic device 1200 by default. This means that when the electronic device is manufactured, a random number generation system is installed in the device. However, the random number generation system may be implemented in various ways. For example, the random number generation system of FIG. 1 is shown to be installed in the electronic device 1200. This random number generation system includes an image sensor module 110 and a random number generation unit 125. For convenience of explanation, a detailed description of the configuration will be omitted.

Meanwhile, the random number generation system may require a database construction step of storing reference values for pixels of each light shield pixel region in a database in order to generate a random number. For the database construction step, it may be effective to release an electronic device with a database constructed through a separate process after the electronic device is manufactured.

As described above, related functions may be implemented in a microprocessor of an image sensor module. When the electronic device is a mobile device, the functions may be implemented in an application processor of the mobile device or as a type of chip included in the mobile device.

Figure 27:
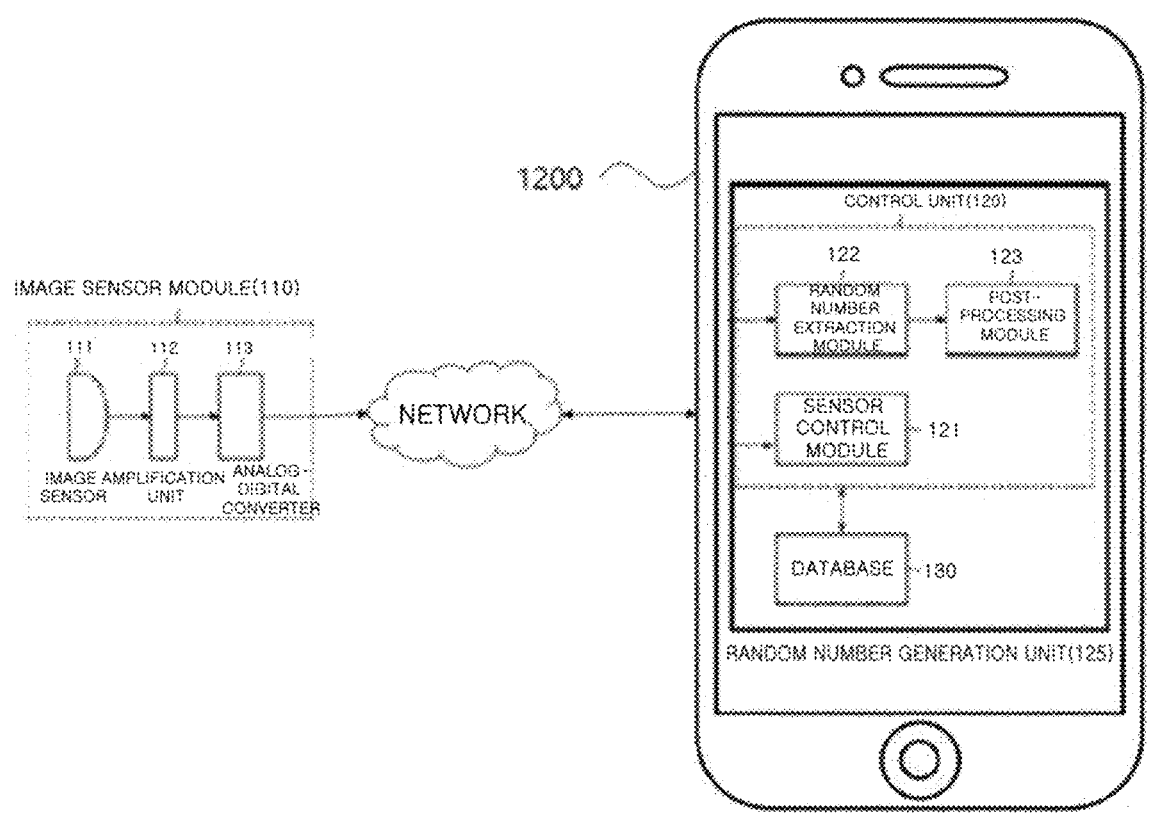

FIG. 27 is an example diagram showing that a random number generation system is applied to an electronic device according to another embodiment of the present invention.

Referring to FIG. 27, a random number is generated using an image sensor module 110 placed in a region physically separated from an electronic device 1200. The image sensor module 110 and the electronic device 1200 may be connected to each other via a network. The embodiment shown in FIG. 23, which uses a separate image sensor 110 that is connected via a network and physically separated, may be applied to a case in which the electronic device does not have an image sensor, a case in which the proportion of dark shot noise among noise generated through an image sensor included in the electronic device is low, or even a case in which the electronic device has an image sensor. For example, the electronic device may include various IoT sensors with no image sensor module. In this case, the image sensor module 110 is shown to be present as the image sensor module, but implementation may be made in which only an image sensor is present. It may be effective that the module is implemented to have an amplification unit, an analog-digital converter, and a network communication unit.

A random number generation unit 125 of the electronic device 1200 may be operated by a program installed in the electronic device 1200 by default or may be operated by downloading an application for performing a corresponding function associated with the random number generation method.

Preferably, the electronic device may receive image data with noise generated from an external-light-shielded pixel region from the image sensor module 110 via a network and may generate a random number through the random number generation unit 125 inside the electronic device 1200 on the basis of the noise included in the image data. Here, operations performed by elements of the random number generation unit 125 are the same as those described above. Some or all functions of the sensor control module 121 may be incorporated into the image sensor module 110 and may be implemented inside the electronic device as shown.

Figure 28:
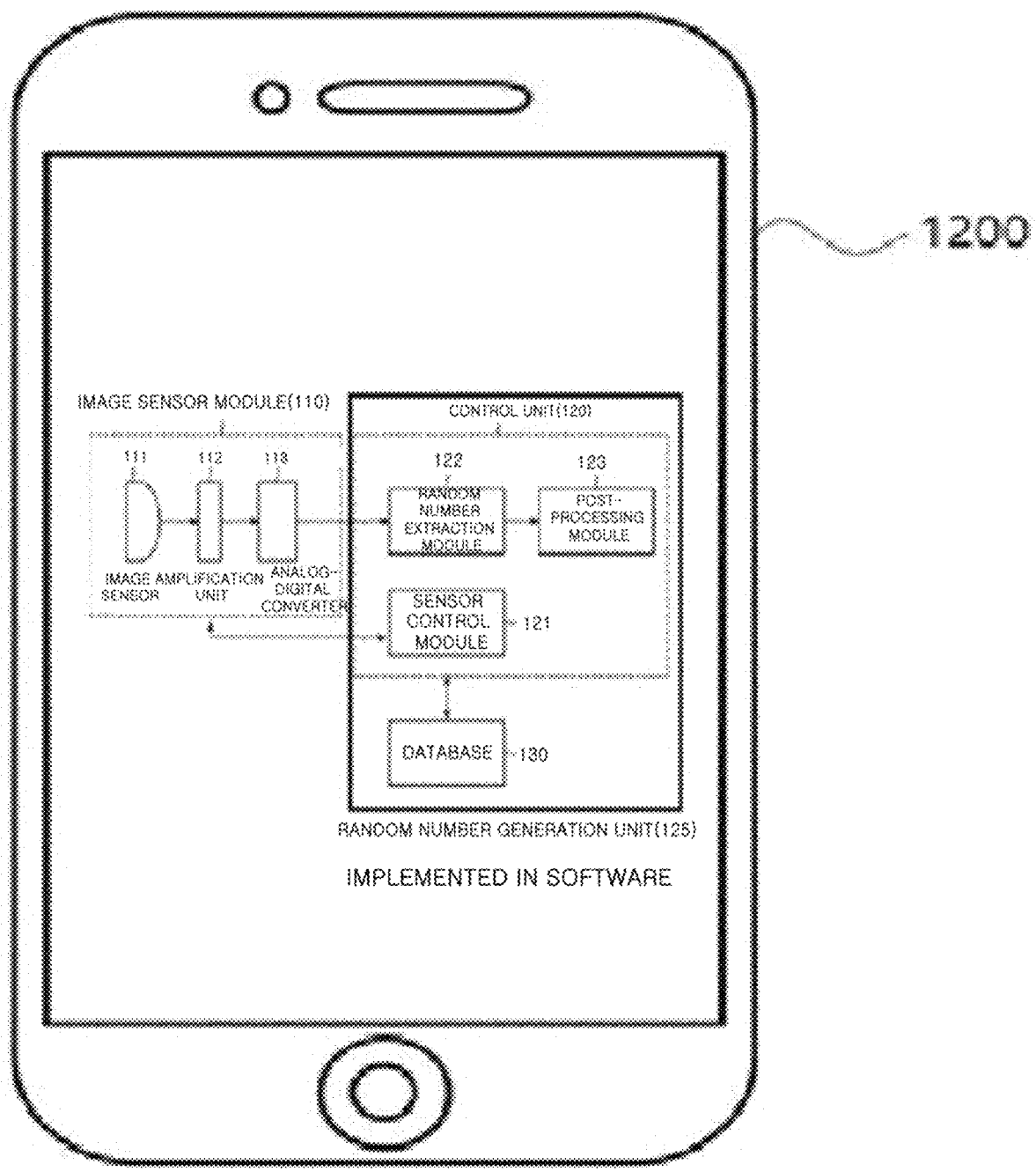
FIG. 28 is an example diagram showing that a random number generation system is applied to an electronic device according to another embodiment of the present invention.

FIG. 28 is an example diagram showing that a random number generation system is applied to an electronic device according to still another embodiment of the present invention. According to this scheme, the random number generation unit 125 is implemented in the electronic device in software. Here, the software may be either a program installed in the electronic device 1200 by default or a specific application associated with the random number generation method downloaded from the outside via a network. The scheme of FIG. 28 may be effective in that the present invention may be easily implemented, for example, by installing separate software according to the present invention in an electronic device that usually has an image sensor. This may be a very effective situation to which the present invention is applied. That is, in most cases, conventionally manufactured mobile phones, cameras, and the like have image sensor modules, and the image sensor modules have light shield pixel regions. Very effective applicability is achieved in that the present invention may be implemented by merely installing software capable of implementing the present invention in an already manufactured electronic device.

Figure 29:
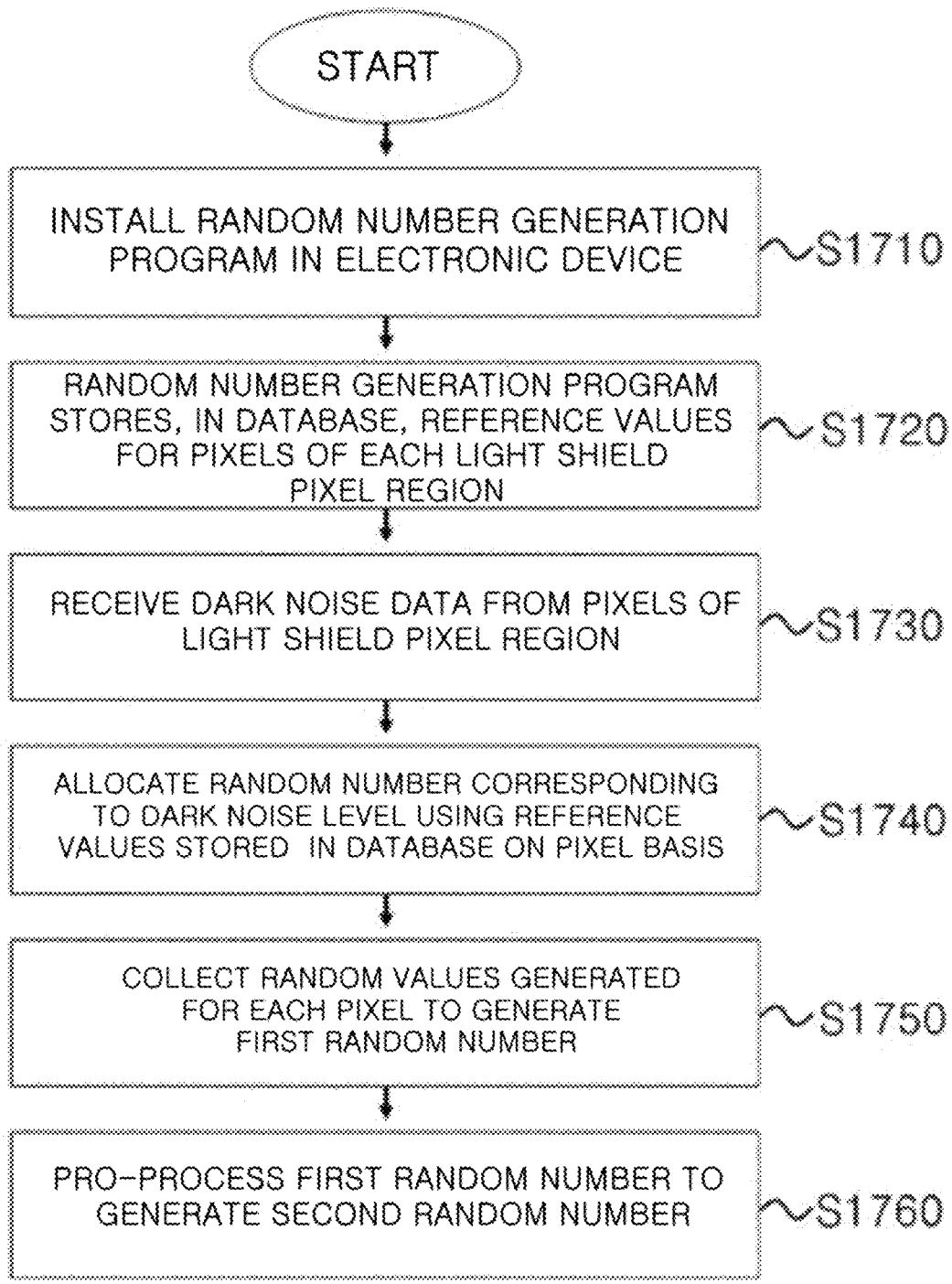
FIG. 29 is a flowchart showing a random number generation method performed by a mobile device shown in FIG. 28.

FIG. 29 is a flowchart showing a random number generation method performed by the mobile device shown in FIG. 28.

In an embodiment, an electronic device 1200 may be equipped with a random number generation program by default, but the random number generation method to be described with reference to FIG. 29 may be a method of installing the random number generation program in the mobile device 1200 to generate a random number.

The mobile device 1200 downloads and installs, for example, a random number generation installation program in order to generate a random number. It will be appreciated that a random number generation program may be installed in various ways other than downloading. Next, the random number generation program stores reference values for pixels of each light shield pixel region in a database (S1720).

The database construction step, which is needed to start to generate a random number, may be performed during or after the program installation step.

When the random number generation is started, first, dark noise of each unit pixel is digitalized and output by an analog-digital converter of an image sensor module, and the digital data is received from the analog-digital converter (S1730). A random number corresponding to a corresponding dark noise level is allocated to the output digital data of the unit pixel using reference values of the corresponding unit pixel stored in the database (S1740). Then, when the random numbers generated for the pixels are collected to generate a first random number (S1750), the first random number is post-processed to acquire a second random number (S1760).

The random number generation program may receive dark noise information (OBP data) generated from the external-light-shielded pixel region.

Also, the image sensor module may be provided in the electronic device, may be provided in a chip inside the electronic device 1200, or may be separately present outside the electronic device 1200 and thus connected to the electronic device 1200 via a network. The detailed operation of the random number generation program is the same as those described above with reference to FIGS. 1 to 13, so a detailed description thereof will be omitted for convenience of explanation.

Figure 30:
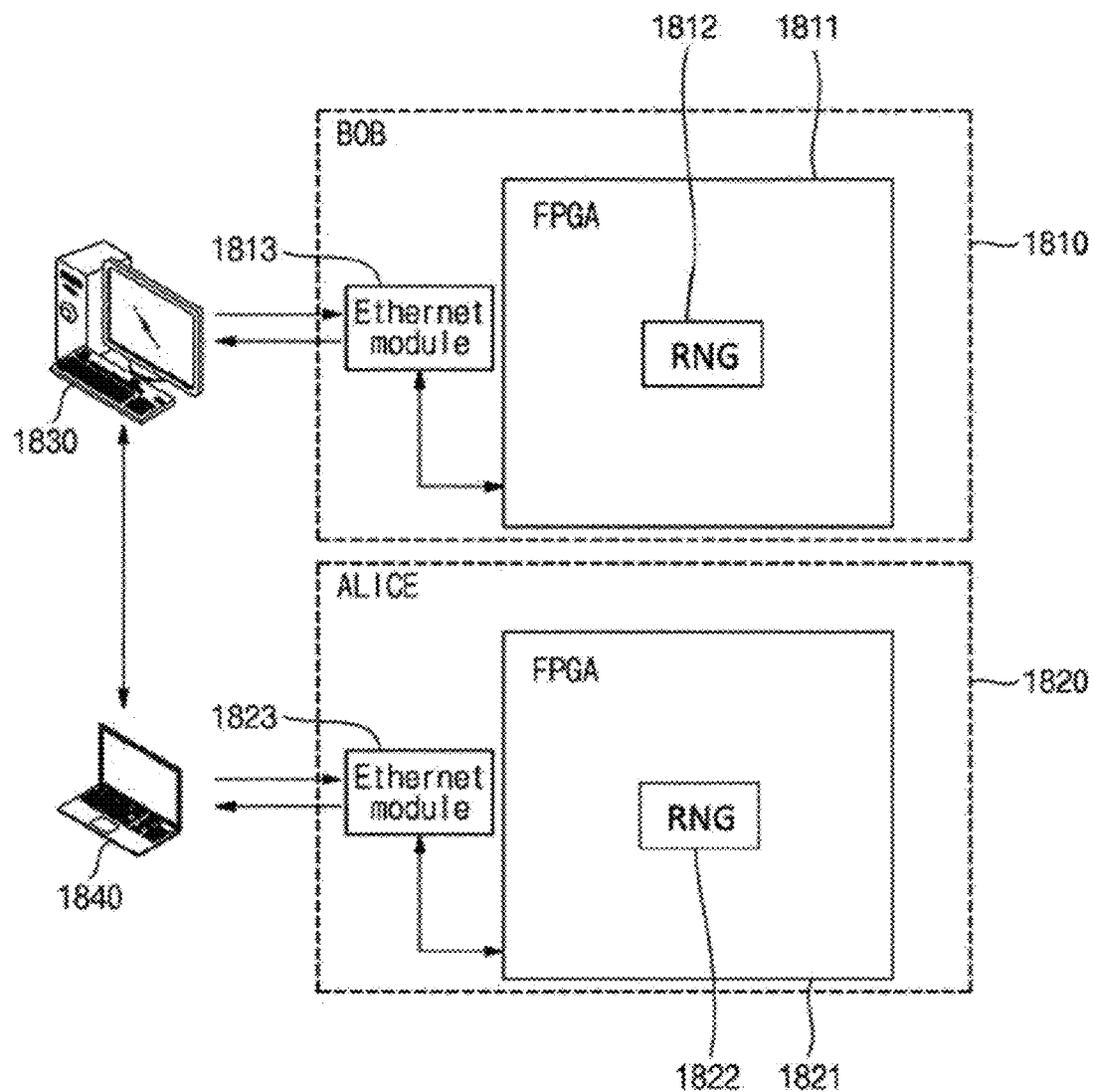
FIG. 30 is a diagram of a quantum cryptography system to which a random number generation system is applied according to the present invention.

FIG. 30 is a diagram of a quantum cryptography system to which a random number generation system is applied according to the present invention.

Referring to FIG. 30, the quantum cryptography system includes a receiving apparatus BOB 1810 and a transmitting apparatus ALICE 1820. The receiving apparatus 1810 and the transmitting apparatus 1820 are connected to terminals 1830 and 1840 through Ethernet modules 1813 and 1823, and the terminals 1830 and 1840 are connected to each other through a general channel.

Preferably, the random number generation system according to the present invention may be applied to random number generators (RNGs) 1812 and 1822 of the receiving apparatus 1810 and the transmitting apparatus 1820. Here, the receiving apparatus 1810 and the transmitting apparatus 1820 are communication apparatuses for performing a process in which the quantum cryptography system distributes a quantum cryptography key. If there is CMOS image sensor, the random number generators 1812 and 1822 may be provided in field-programmable gate arrays (FPGAs) 1811 and 1821 included in the receiving apparatus 1810 and the transmitting apparatus 1820 in order to drive optical elements and process signal outputs.

Also, FIG. 30 shows only the random number generators 1812 and 1822 to which the random number generation system according to the present invention is applied. The configurations of the receiving apparatus 1810 and the transmitting apparatus 1820 may be easily implemented by those skilled in the art, and the implementation may be variously modified.

Preferably, the FPGAs 1811 and 1821 may determine whether there is a physical problem with the hardware elements of the receiving apparatus 1810 and the transmitting apparatus 1820 before a random number is generated through the random number generators 1812 and 1822. For example, the FPGAs 1811 and 1821 may determine whether there is a physical problem with the hardware elements of the receiving apparatus 1810 and the transmitting apparatus 1820 by checking the integrity of an Ethernet channel by checking the socket connection and operation of an avalanche photodiode (APD) included in the receiving apparatus 1810 or by verifying synchronization between the receiving apparatus 1810 and the transmitting apparatus 1820 through a pin photodiode (PIN PD) included in the transmitting apparatus 1820. When it is determined that there is no physical problem with the hardware elements of the receiving apparatus 1810 and the transmitting apparatus 1820, random numbers are generated according to the above-described random number generation system through the random number generators 1812 and 1822 of the FPGAs 1811 and 1821. When it is determined that there is no physical problem in the hardware components of the receiving apparatus 1810 and the transmitting apparatus 1820 but that an abnormal phenomenon occurs, the FPGAs 1811 and 1821 may stabilize the receiving apparatus 1810 and the transmitting apparatus 1820 in consideration of an environmental change near both channels and then may generate random numbers through the random number generators 1812 and 1822.

Figure 31:
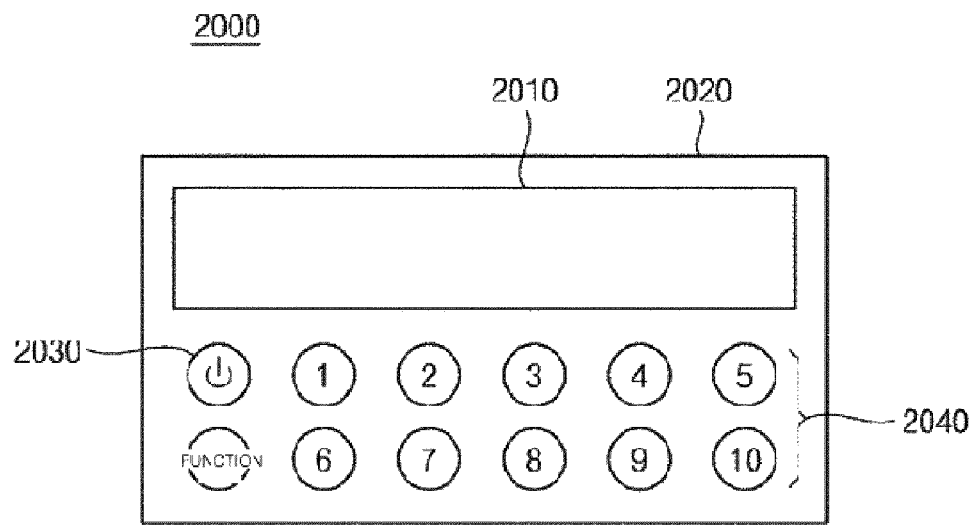
FIGS. 31 and 32 show that the random number generation apparatus of the present invention is applied to a one-time password (OTP) terminal.
Figure 32:
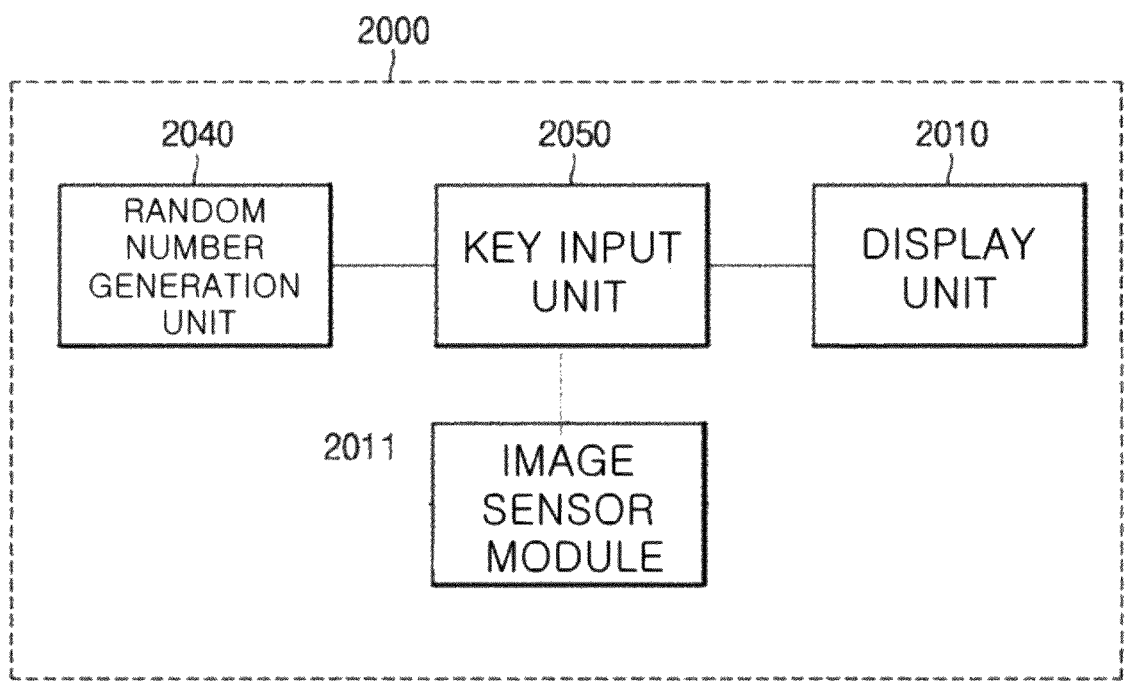

FIGS. 31 and 32 show that the random number generation apparatus of the present invention is applied to a one-time password (OTP) terminal.

An OTP terminal 2000 has a key input unit 2040 installed in the front side of the main body to turn on the terminal, enter a password, and the like. The OTP terminal 2000 includes a display unit 2010 configured to display an authentication number generated by the OTP terminal 2000, a random number generation unit 2040 configured to generate a one-time password according to a predetermined cryptography key corresponding to the current time (per minute) when a user enters a predetermined password, and an image sensor module 2011. The functions of the random number generation unit 2040 and the image sensor module 2011 are the same as those described above.

Figure 33:
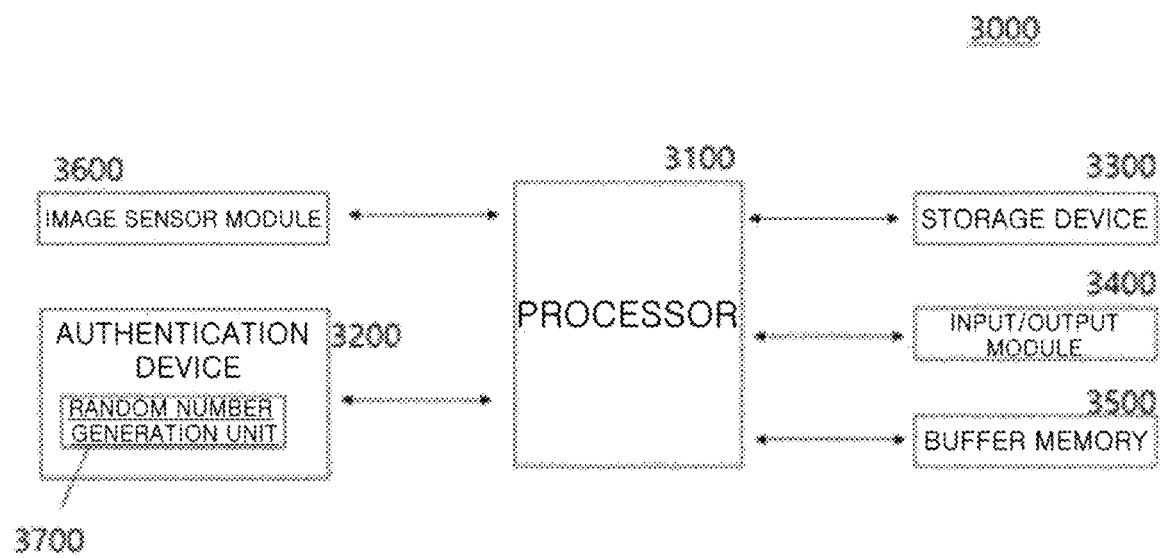
FIG. 33 is a diagram illustrating that the random number generation apparatus of the present invention is inserted into a mobile device in the form of an authentication apparatus.

FIG. 33 is a diagram illustrating that the random number generation apparatus of the present invention is inserted into a mobile device in the form of an authentication apparatus.

FIG. 33 shows that the authentication apparatus is present outside a processor 3100 such as an application processor. However, the location of the authentication apparatus of the present invention is not necessarily limited thereto. The authentication apparatus of the present invention may be present inside the processor 3100.

The processor 3100 may be implemented to control the entire operation of the mobile apparatus 3000 and control wired/wireless communication with the outside. For example, the processor 3100 may be an application processor (AP), an integrated modem application processor (ModAP), or the like. A buffer memory 3500 may be implemented to temporarily store data needed during a processing operation of the mobile apparatus 3000. An input/output module 3400, which is a display/touch module, may be implemented to display data processed by the processor 3100 or to receive data from an input apparatus such as a touch panel. A storage apparatus 3300 may be implemented to store user data. The storage apparatus 3300 may be an embedded multimedia card (eMMC), a solid state drive (SSD), a universal flash storage (UFS), or the like. The storage apparatus 3300 may include at least one non-volatile memory apparatus.

Essential elements of the present invention, such as the image sensor module 3600 and the random number generation unit 3700, may be included in the authentication device 3200, and the image sensor module may be separately configured. Also, the image sensor module 3600 and the random number generation unit 3700 may perform transmission and reception through the processor 3100 or directly.

An embodiment in which the random number generation system of the present invention is applied to an electronic device will be described below, and the above-described configurations will be briefly mentioned. Also, the following description will be provided using an example electronic device, but may be applied to various kinds of electronic devices.

The random number generation method according to an embodiment of the present invention can also be implemented as computer-readable codes on a computer-readable recording medium. The computer-readable recording medium includes any type of recording apparatus in which data readable by a computer system is stored.

Examples of the computer-readable recording medium include a read-only memory (ROM), a random-access memory (RAM), a CD-ROM, a magnetic tape, a hard disk, a floppy disk, a mobile storage device, a non-volatile memory (flash memory), and an optical data storage device.

The computer-readable recording medium can also be distributed over computer systems connected through a computer communication network so that the computer readable code is stored and executed in a distributed fashion.

While the preferred embodiments of the random number generation method using the image sensor and the random number generation system for performing the method according to the present invention have been described, the present invention is not limited thereto, and various modifications may be made therein within the scope of the appended claims, the detailed description of the invention, and the accompanying drawings and would fall within the scope of the present invention.

What is claimed is:

1. A random number generation method comprising:
   (a) outputting, as digital data, electric currents generated from unit pixel regions of an image sensor shielded from external light on a unit pixel basis;
   (b) classifying the digital data for each unit pixel using a database in which a plurality of reference values are stored for each unit pixel and then allocating random numbers; and
   (c) collecting the random numbers allocated for each unit pixel to generate a first random number.

2. The random number generation method of claim 1, further comprising performing a post-process for removing technical noise on the first random number to generate a second random number.

3. The random number generation method of claim 1, wherein the reference values stored for each unit pixel are different from those for other unit pixels.

4. The random number generation method of claim 1, wherein the number of reference values stored for each unit pixel is three, seven, or fifteen.

5. The random number generation method of claim 1, wherein construction of the database comprises:
   measuring an electric current distribution for each unit pixel;
   determining a bit to be allocated according to the electric current distribution for each unit pixel; and
   deriving reference values for classifying the digital data according to the bit to be allocated.

6. The random number generation method of claim 5, wherein the determining of a bit to be allocated according to the electric current distribution is performed using a min-entropy method.

7. The random number generation method of claim 1, wherein the electric current distribution for each unit pixel is a Poisson distribution.

8. The random number generation method of claim 1, the shielding of external light in the image sensor is performed by covering the image sensor with a cap or by making some of the image sensor with light-shielded unit pixels.

9. The method of claim 1, wherein an electric current distribution for each unit pixel is a Poisson distribution.

10. The random number generation system of claim 1, wherein the image sensor is a complementary metal-oxide-semiconductor (CMOS), a charge-coupled device (CCD), an infrared LED array, or a bolometer.

11. A computer-readable recording medium having a computer program recorded thereon for the random number generation method of claim 1.

12. A method of constructing a database to generate a random number, the method comprising:
   measuring an electric current distribution for each unit pixel of an image sensor shielded from external light;
   determining a bit to be allocated according to the electric current distribution for each unit pixel; and
   deriving reference values for classifying digital data according to the bit to be allocated.

13. The method of claim 12, wherein the determining of a bit to be allocated according to the electric current distribution is performed using a min-entropy method.

14. The method of claim 12, wherein the reference values stored for each unit pixel are different from those for other unit pixels.

15. A random number generation system comprising an image sensor module configured to output, as digital data, electric currents generated from unit pixel regions of an image sensor shielded from external light;
   a database wherein a plurality of reference values are stored for each unit pixel; and
   a control unit configured to classify the digital data for each unit pixel using the database, allocate random numbers, and collect the random numbers allocated for each unit pixel to generate a first random number.

16. The random number generation system of claim 15, wherein the image sensor comprises:
   an effective pixel region including a plurality of effective pixels in order to convert external light into an electric signal; and
   a light shield pixel region, which includes a plurality of light-shielded pixels, that outputs electric currents generated while external light is shielded.

17. The random number generation system of claim 16, wherein a light shield layer for shielding external light is provided in the pixels of the light shield pixel region.

18. The random number generation system of claim 16, wherein an average dark current of the pixels of the light shield pixel region is greater than that of the pixels of the effective pixel region.

19. The random number generation system of claim 16, wherein an electric current output from the light shield pixel region is used to correct a reset signal of effective pixel data of the effective pixel region.

20. The random number generation system of claim 15, wherein a control unit further performs a post-process for removing technical noise on the first random number to generate a second random number.

21. The random number generation system of claim 15, wherein the image sensor module comprises:
   an image sensor; and an analog-digital converter configured to digitally change an electric current signal output from the image sensor.

* * * * *